(12) United States Patent
Cain

(10) Patent No.: US 12,135,885 B2
(45) Date of Patent: Nov. 5, 2024

(54) VIRTUAL STORAGE POLICIES FOR VIRTUAL PERSISTENT VOLUMES

(71) Applicant: HEWLETT PACKARD ENTERPRISE DEVELOPMENT LP, Houston, TX (US)

(72) Inventor: Bradley Cain, Westborough, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 593 days.

(21) Appl. No.: 16/779,139

(22) Filed: Jan. 31, 2020

(65) Prior Publication Data

US 2021/0240369 A1 Aug. 5, 2021

(51) Int. Cl.
G06F 3/06 (2006.01)
G06F 9/455 (2018.01)

(52) U.S. Cl.
CPC .......... *G06F 3/0631* (2013.01); *G06F 3/0604* (2013.01); *G06F 3/0644* (2013.01); *G06F 3/0664* (2013.01); *G06F 3/0679* (2013.01); *G06F 9/45558* (2013.01); *G06F 2009/45583* (2013.01)

(58) Field of Classification Search
CPC .............. G06F 3/0631; G06F 9/45558; G06F 2009/45583
See application file for complete search history.

(56) References Cited

U.S. PATENT DOCUMENTS

| | | | |
|---|---|---|---|
| 6,442,700 B1 | 8/2002 | Cooper | |
| 6,457,135 B1 | 9/2002 | Cooper | |
| 6,823,516 B1 | 11/2004 | Cooper | |
| 7,587,570 B2 | 9/2009 | Sarkar et al. | |
| 7,930,476 B1 | 4/2011 | Castelli et al. | |

(Continued)

FOREIGN PATENT DOCUMENTS

| | | | |
|---|---|---|---|
| CN | 1688981 A | 10/2005 | |
| CN | 101809559 A | 8/2010 | |

(Continued)

OTHER PUBLICATIONS

Red Hat OpenShift, "Dynamic Provisioning and Creating Storage Classes", Jul. 16, 2019 [retrieved from internet May 18, 2019][<URL: https://web.archive.org/web/20190716081123/https://docs.openshift.com/container-platform/3.4/install_config/persistent_storage/dynamically_provisioning_pvs.html>] (Year: 2019).*

(Continued)

*Primary Examiner* — David Yi
*Assistant Examiner* — Nicholas A. Paperno
(74) *Attorney, Agent, or Firm* — Trop, Pruner & Hu, P.C.

(57) ABSTRACT

Example implementations relate to virtual persistent volumes. In an example, a virtual persistent volume storage class is presented to a container orchestrator that includes parameters describing an associated virtual storage policy. In response to a provisioning request that identifies the virtual persistent volume storage class, a virtual persistent volume is created by determining a mapping of the parameters of the virtual persistent volume storage class to parameters of available storage classes so that the parameters of the virtual persistent volume storage class are fulfilled. At least one volume is provisioned to constitute the virtual persistent volume, according to the mapping.

19 Claims, 6 Drawing Sheets

(56) References Cited

U.S. PATENT DOCUMENTS

| | | | |
|---|---|---|---|
| 8,386,610 B2 | 2/2013 | Yahalom et al. |
| 8,478,799 B2 | 7/2013 | Beaverson et al. |
| 8,621,461 B1 | 12/2013 | Chandrachari et al. |
| 9,015,713 B2 | 4/2015 | Baset et al. |
| 9,021,476 B1 | 4/2015 | Pratt |
| 9,135,046 B1 | 9/2015 | Pratt |
| 9,372,758 B2 | 6/2016 | Ashutosh et al. |
| 9,418,015 B2 | 8/2016 | Sundaram et al. |
| 9,432,350 B2 | 8/2016 | Anderson et al. |
| 9,436,391 B1 | 9/2016 | Lewis et al. |
| 9,590,879 B2 | 3/2017 | Wray |
| 9,667,725 B1 | 5/2017 | Khanduja et al. |
| 9,705,730 B1 | 7/2017 | Petri et al. |
| 9,798,474 B2 | 10/2017 | Barzik et al. |
| 9,800,575 B1 | 10/2017 | Lewis et al. |
| 10,013,196 B2 | 7/2018 | Tylik et al. |
| 10,055,420 B1* | 8/2018 | Pogde ................ G06F 11/1448 |
| 10,127,234 B1 | 11/2018 | Krishnan et al. |
| 10,140,139 B1 | 11/2018 | Pratt |
| 10,146,580 B2 | 12/2018 | Chen |
| 10,216,455 B1 | 2/2019 | Schroeder et al. |
| 10,223,024 B2 | 3/2019 | Sharma |
| 10,241,709 B2 | 3/2019 | Scales et al. |
| 10,326,744 B1 | 6/2019 | Nossik et al. |
| 10,397,236 B1 | 8/2019 | Chadha et al. |
| 10,432,483 B1 | 10/2019 | Thompson |
| 10,452,298 B2 | 10/2019 | Kurjanowicz et al. |
| 10,500,441 B2 | 12/2019 | Lagree |
| 11,636,280 B2 | 4/2023 | Cui et al. |
| 2002/0120741 A1 | 8/2002 | Webb et al. |
| 2002/0152305 A1 | 10/2002 | Jackson et al. |
| 2004/0120225 A1 | 6/2004 | Dalal et al. |
| 2004/0123029 A1 | 6/2004 | Dalal et al. |
| 2004/0123030 A1 | 6/2004 | Dalal et al. |
| 2004/0123062 A1 | 6/2004 | Palal et al. |
| 2004/0123063 A1 | 6/2004 | Dalal et al. |
| 2005/0060722 A1 | 3/2005 | Rochette et al. |
| 2005/0283567 A1 | 12/2005 | Popescu-Stanesti et al. |
| 2007/0044004 A1 | 2/2007 | Hino et al. |
| 2007/0283091 A1 | 12/2007 | Nagae et al. |
| 2007/0283119 A1 | 12/2007 | Sarkar et al. |
| 2009/0172666 A1 | 7/2009 | Yahalom et al. |
| 2009/0182928 A1 | 7/2009 | Becker et al. |
| 2009/0183173 A1 | 7/2009 | Becker et al. |
| 2009/0249018 A1 | 10/2009 | Nojima et al. |
| 2010/0070725 A1 | 3/2010 | Prahlad et al. |
| 2010/0077160 A1 | 3/2010 | Liu et al. |
| 2010/0198795 A1 | 8/2010 | Chen et al. |
| 2010/0235832 A1 | 9/2010 | Rajagopal et al. |
| 2011/0060878 A1 | 3/2011 | Kaneko et al. |
| 2011/0113202 A1 | 5/2011 | Branover et al. |
| 2011/0124409 A1 | 5/2011 | Baynes et al. |
| 2012/0017046 A1 | 1/2012 | Mehta et al. |
| 2012/0089850 A1 | 4/2012 | Sharp et al. |
| 2012/0117029 A1 | 5/2012 | Gold |
| 2012/0311292 A1 | 12/2012 | Maniwa et al. |
| 2012/0317355 A1 | 12/2012 | Ishizaki et al. |
| 2013/0042083 A1 | 2/2013 | Mutalik et al. |
| 2013/0054889 A1 | 2/2013 | Vaghani et al. |
| 2013/0054932 A1 | 2/2013 | Acharya et al. |
| 2013/0290648 A1 | 10/2013 | Shao et al. |
| 2013/0297871 A1 | 11/2013 | Reddy |
| 2014/0006740 A1 | 1/2014 | Tokusho et al. |
| 2014/0130055 A1 | 5/2014 | Guha |
| 2014/0156877 A1 | 6/2014 | Tylik et al. |
| 2014/0173675 A1 | 6/2014 | Ahmed et al. |
| 2014/0245016 A1 | 8/2014 | Desai et al. |
| 2015/0215417 A1 | 7/2015 | Chetlur et al. |
| 2015/0217164 A1 | 8/2015 | Lagree |
| 2016/0041787 A1 | 2/2016 | Nicolae |
| 2016/0070652 A1 | 3/2016 | Sundararaman et al. |
| 2016/0188421 A1 | 6/2016 | Karinta et al. |
| 2016/0196217 A1 | 7/2016 | Chiu et al. |
| 2016/0291892 A1 | 10/2016 | Rao et al. |
| 2016/0357450 A1 | 12/2016 | Rao et al. |
| 2017/0013046 A1 | 1/2017 | Flynn |
| 2017/0083250 A1* | 3/2017 | Beeken ................ G06F 3/0619 |
| 2017/0087470 A1 | 3/2017 | Bostick et al. |
| 2017/0116273 A1 | 4/2017 | Liu et al. |
| 2017/0139782 A1 | 5/2017 | Chen |
| 2017/0177224 A1* | 6/2017 | Glover ................ G06F 3/0653 |
| 2017/0279797 A1 | 9/2017 | Cross et al. |
| 2017/0315795 A1 | 11/2017 | Keller |
| 2018/0083845 A1 | 3/2018 | Chan et al. |
| 2018/0181756 A1 | 6/2018 | Campagna et al. |
| 2018/0203865 A1 | 7/2018 | Srinivasan et al. |
| 2018/0239559 A1 | 8/2018 | Venetsanopoulos et al. |
| 2018/0276689 A1 | 9/2018 | Zhang et al. |
| 2018/0300073 A1 | 10/2018 | Chircop |
| 2018/0300325 A1 | 10/2018 | Chircop |
| 2018/0343019 A1 | 11/2018 | Xiang et al. |
| 2019/0050257 A1 | 2/2019 | Srinivasan |
| 2019/0065323 A1 | 2/2019 | Dhamdhere et al. |
| 2019/0102265 A1 | 4/2019 | Ngo et al. |
| 2019/0114102 A1 | 4/2019 | Chen |
| 2019/0158541 A1 | 5/2019 | Miriyala et al. |
| 2019/0212998 A1 | 7/2019 | Vallala et al. |
| 2019/0235761 A1 | 8/2019 | Watkins et al. |
| 2019/0236316 A1 | 8/2019 | Watkins et al. |
| 2019/0266100 A1 | 8/2019 | Mello et al. |
| 2019/0310873 A1 | 10/2019 | Amann et al. |
| 2019/0361618 A1 | 11/2019 | Avraham et al. |
| 2020/0042214 A1 | 2/2020 | Chen et al. |
| 2020/0241909 A1* | 7/2020 | Govindaraju ......... G06F 9/5016 |
| 2020/0241999 A1 | 7/2020 | Guim et al. |
| 2020/0310849 A1 | 10/2020 | Laurence et al. |
| 2020/0311299 A1 | 10/2020 | Amar |
| 2020/0322453 A1 | 10/2020 | Said et al. |
| 2020/0379880 A1 | 12/2020 | Rodrigues Rosa, Jr. |
| 2021/0008413 A1 | 1/2021 | Asikainen et al. |
| 2021/0109683 A1 | 4/2021 | Cain |
| 2021/0109772 A1 | 4/2021 | Jaloma et al. |
| 2021/0124614 A1 | 4/2021 | Gupta et al. |
| 2021/0133338 A1 | 5/2021 | Chopra et al. |
| 2021/0173815 A1 | 6/2021 | Kazi et al. |
| 2021/0397356 A1 | 12/2021 | Cain |

FOREIGN PATENT DOCUMENTS

| | | | |
|---|---|---|---|
| CN | 104395904 A | 3/2015 |
| CN | 108718328 A | 10/2018 |
| CN | 110019081 A | 7/2019 |
| CN | 110178127 A | 8/2019 |
| EP | 3657358 B1 | 1/2024 |

OTHER PUBLICATIONS

Red Hat, What is container orchestrations?, Dec. 2, 2019 [retrieved from internet Jan. 4, 2022][<URL:https://www.redhat.com/en/topics/containers/what-is-container-orchestration>] (Year: 2019).*

Hitachi Vantara Knowledge, "Storage Plug-in for Containers Quick Reference Guide v2.0.1", available online at <https://knowledge.hitachivantara.com/Documents/Adapters_and_Drivers/Storage_Adapters_and_Drivers/Containers/2.0.1/01_Storage_Plug-in_for_Containers_Quick_Reference_Guide_v1.0.0>, Mar. 20, 2019, 45 pages.

Jay Vyas, "Kubernetes Storage: Dynamic Volumes and the Container Storage Interface", TheNewStack, available online at <https://thenewstack.io/kubernetes-storage-dynamic-volumes-and-the-container-storage-interface/>, May 7, 2019, 17 pages.

HPE, "GUI Administration Guide", Version 5.1.x, Nov. 2, 2020, 306 pages.

Kubernetes, "Horizontal Pod Autoscaler", available online at <https://web.archive.org/web/20191217234051/https://kubernetes.io/docs/tasks/run-application/horizontal-pod-autoscale/>, Dec. 17, 2019, 9 pages.

Martinsen, Rudi, "Limiting disk i/o in vSphere", available online at <https://rudimartinsen.com/2018/06/18/limiting-disk-i-o-in-vsphere/>, Jun. 18, 2018, 7 pages.

VMware, "vSphere Resource Management", Update 1, 2017, 146 pages.

(56) References Cited

OTHER PUBLICATIONS

Ali et al., "Performance Analysis Framework to Optimize Storage Infrastructure for Cloud Computing," Aug. 30, 2012, 6 pages.
Aluciani, "Nutanix Releases New Kubernetes CSI-Based Driver," available online at <https://next.nutanix.com/blog-40/nutanix-releases-new-kubernetes-csi-based-driver-30941>, Nutanix, Inc., Sep. 26, 2018, 7 pages.
Anoop Vijayan Maniankara, "Understanding the Container Storage Interface (CSI)", available online at <https://medium.com/google-cloud/understanding-the-container-storage-interface-csi-ddbeb966a3b>, Aug. 13, 2018, pp. 1-8.
DataCore Software, "Container Persistent Storage", available online at <https://www.datacore.com/products/software-defined-storage/container-storage/>, 2019, 9 pages.
Dejan Živanovic, "EMC: The Virtual Data Center", 2008, pp. 1-24.
Dell EMC, "Dell EMC Isilon ONEFS: A Technical Overview", Nov. 2017, pp. 1-37.
Dell Inc., "Dell MD Storage Array VMware vStorage APIs for Storage Awareness (VASA) Provider (Client): User's Guide", 2015, pp. 1-21.
Edward L. Haletky, "Virtual storage appliance market: Categories, capabilities", available online at <https://searchstorage.techtarget.com/tip/Virtual-storage-appliance-market-Categories-capabilities>, Retrieved on Jun. 27, 2019, 3 pages.
EMC Corporation, "EMC Announces EMC Invista Network Storage Virtualization Platform", available online at <https://corporate.delltechnologies.com/en-us/newsroom/announcements/2005/05/20050516-3130.htm>, May 16, 2005, 5 pages.
EMC Corporation, "EMC® Rainfinity® File Management Appliance/VE Version 7.3: Getting Started Guide", Dec. 2009, pp. 1-78.
EMC Corporation, "EMC® Rainfinity® Global File Virtualization™ Application Version 7.2: Installation and User Guide", Jan. 2008, pp. 1-232.
EMC Corporation, "EMC® Rainfinity® Global Namespace Appliance Version 1.2.1: Getting Started Guide", Dec. 2008, pp. 1-132.
EMC Invista on Brocade, "Network-Based Storage Virtualization with EMC Invista and the Brocade Application Platform", Sep. 2007, 3 pages.
EMC2, "A Guide to Virtualizing Your Information Infrastructure", Oct. 2007, 12 pages.
EMC2, "EMC Rainfinity Global File Virtualization: Transparent Data Mobility for Heterogeneous File Storage", Oct. 2008, 2 pages.
F5 Networks, Inc., "Intelligent File Virtualization with F5 ARX", F5 White Paper, 2009, 11 pages.
F5 Networks, Inc., "Simplify Data Management and Reduce Storage Costs with File Virtualization", ARX Series, 2013, pp. 1-9.
Incipient, Inc., "Incipient NSP Addresses SAN Management Challenges by Reducing Complexity", 2006, 3 pages.
Janakiram MSV, "Managing Persistence for Docker Containers", available online at <https://thenewstack.io/methods-dealing-container-storage/>, Sep. 23, 2016, 20 pages.

Kirill Goltsman, "Software-Defined Storage Solutions for Kubernetes", available online at <https://supergiant.io/blog/software-defined-storage-solutions-for-kubernetes/>, Feb. 8, 2019, 10 pages.
Kubernetes, "Introducing Container Storage Interface (CSI) Alpha for Kubernetes", available online at <https://kubernetes.io/blog/2018/01/introducing-container-storage-interface/>, Jan. 10, 2018, pp. 1-10.
Kubernetes, "Local Persistent Volumes for Kubernetes Goes Beta", available online at <https://kubernetes.io/blog/2018/04/13/local-persistent-volumes.beta/>, Apr. 13, 2018, 7 pages.
Michael Yakobi, "Understanding Kubernetes Persistent Volumes Provisioning", NetApp, available online at <https://cloud.netapp.com/blog/understanding-kubernetes-persistent-volumes-provisioning>, Nov. 20, 2018, 3 pages.
NetApp, "Using NetApp with Docker and Kubernetes", SL10236 Version 1.0.2, May 2018, pp. 1-58.
Piotr Mrowczynski, "Scaling cloud-native Apache Spark on Kubernetes for workloads in external storages", Sep. 21, 2018, 63 pages.
Pirus Networks, "Pirus Networks offers new utility switch", available online at <https://www.computerweekly.com/news/2240044579/Pirus-Networks-offers-new-utility-switch>, Mar. 11, 2002, pp. 1-3.
Pirus Networks, "Pirus Product Overview", available online on <http://web.archive.org/web/20011031022514/http://www.pirus.com/products.html>, Oct. 31, 2001, pp. 1-2.
Red Hat OpenShift, "Persistent Storage", available online at <https://docs.openshift.com/online/architecture/additional_concepts/storage.html>, Retrieved online on Jun. 28, 2019, 9 pages.
Sun Microsystems, "Storage White Paper: Intelligent Storage Platform", available online at <http://web.archive.org/web/20030201194118/http://www.sun.com/storage/white-papers/intelligent_storage_platform.html>, Feb. 1, 2003, pp. 1-5.
Tech Target, "Application-aware Storage Promises Intelligence and Automation," available online at <https://web.archive.org/web/20160817083831/https://searchstorage.techtarget.com/feature/Application-aware-storage-promises-intelligence-and-automation>, Aug. 17, 2016, 5 pages.
Tushar Thole, "Part 1: Storage Policy Based Management for Containers Orchestrated by Kubernetes", vmware, available online at <https://blogs.vmware.com/virtualblocks/2017/04/17/storage-policy-based-management-containers-orchestrated-kubernetes/>, Apr. 17, 2017, 4 pages.
VMware, Inc., "APIs for Storage Awareness (VASA) Package", available online at <https://code.vmware.com/web/dp/other-programs/storage/vasa>, retrieved in 2020, 4 pages.
VMware, Inc., "vSphere Storage", Jun. 27, 2019, pp. 1-319.
Wikipedia, "OneFS distributed file system", Aug. 29, 2019, pp. 1-5.
The Linux Information Project, "The /mnt Directory," Feb. 13, 2006, <http://www.linfo.org/mnt.html>, 1 page.
Schenker, Gabriel N et al., "Getting started with containerization: reduce the operational burden on your system by automating and managing your containers", 2019, 3 pages.

\* cited by examiner

VIRTUAL STORAGE POLICIES FOR VIRTUAL PERSISTENT VOLUMES

BACKGROUND

Containers are a type of virtualization. A container may include an application packaged together with dependencies and libraries. A containerized application may use or generate persistent data.

BRIEF DESCRIPTION OF THE DRAWINGS

Various examples will be described below with reference to the following figures.

DETAILED DESCRIPTION

Figure 1:
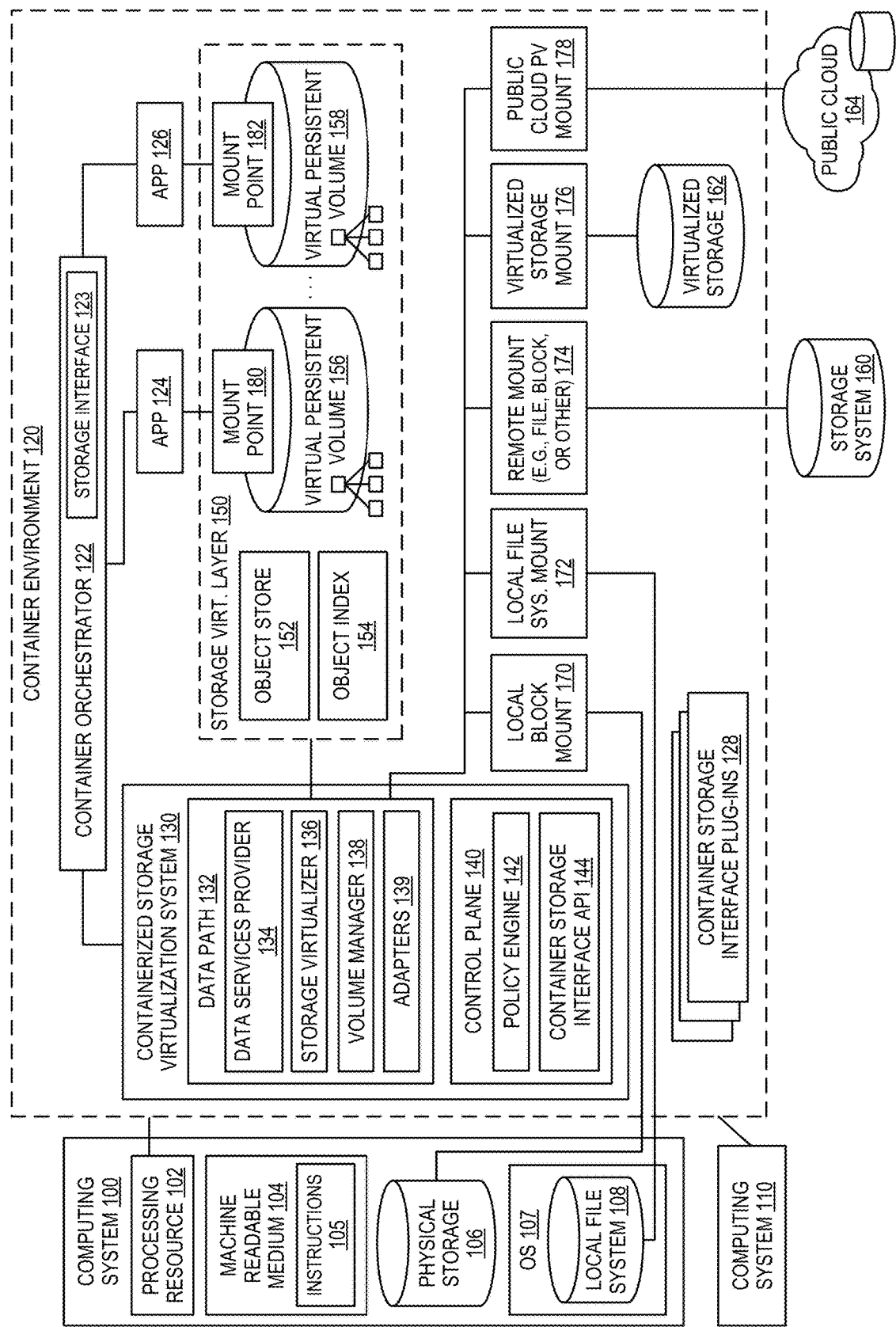
FIG. 1 depicts an example system that creates a virtual persistent volume that aggregates a plurality of different underlying storage and is presented to a containerized application.

Container technology is a computing virtualization paradigm where an application is packaged together with dependencies and libraries in a container to provide an isolated environment for running the application. Such an application may be referred to as a containerized application. Many containers can run on top of a single operating system, but each container is inherently isolated from other containers. In this manner, the container paradigm may be understood to virtualize the operating system. Containers may be more lightweight than other forms of virtualization such as virtual machines, which virtualize hardware. For example, each virtual machine may have its own copy of an operating system kernel, while by contrast, multiple containers may share an operating system kernel.

Containerized applications may need storage to retain persistent data. Container orchestrators (such as Kubernetes) may provide the capability of provisioning some storage for a container. However, many types of storage exist, including but not limited to storage that is local to the container, remote to the container, hardware (e.g., locally attached drive), software-defined (e.g., a file system, virtualized or containerized storage, storage presented via an API, etc.), or storage having a combination of the foregoing aspects. Prior efforts at provisioning container storage may fail to provide the levels of storage configuration flexibility and data services that users and administrators of container environments desire. For example, a container orchestrator may be limited to provisioning one type of storage for an application. Other types of systems may attempt to concatenate multiple volumes together into a single volume, but such concatenation may not have the flexibility to provide certain data services without disrupting user access to the data.

Additionally, users or administrators may like to create and/or select from one or more storage policies to provision persistent storage for a container. Different storage policies may be aligned with different storage goals such as, for example, different levels of service (e.g., gold, silver, bronze tier service), capacity, cost, performance (e.g., archival or real-time storage), latency, data protection, redundancy (e.g., number of failures to tolerate), backup policy (e.g., number of backups, backup schedule, etc.), recovery time objective (RTO), recovery point objective (RPO), or other measures. However, the characteristics of various storage types available in the container environment may be described in a non-standardized manner, and an administrator may need to spend time to manually design and code for the provisioning of one or more storage volumes to meet storage policy goals. Such manual storage design and provisioning may be difficult to perform optimally or at all, particularly for complex policy goals with multiple constraints.

To address the foregoing technical challenges, examples described herein relate to a storage virtualization system and a policy engine thereof that presents to a container orchestrator a virtual persistent volume (also referred to herein as a virtual PV) storage class that includes parameters describing an associated virtual storage policy. In some instances, multiple virtual PV storage classes associated with different virtual storage policies may be presented. The storage virtualization system may receive a persistent volume provisioning request that identifies the virtual PV storage class. In response, the storage virtualization system may create a virtual PV by determining a mapping between parameters of the virtual PV storage class to parameters of storage classes available in the container environment in a manner that fulfills the parameters of the virtual PV storage class. At least one volume is provisioned in accordance with the mapping from storage types represented by the storage classes available in the container environment. In some instances, multiple volumes may be provisioned and blended by a data path of the storage virtualization system. A virtual PV comprising the provisioned volume or blended volumes may then be made available, via a container orchestrator for example, to a containerized application. Thus, by virtue of the foregoing, a virtual PV may be created and provided to a containerized application based on selection of a storage class that is descriptive of a particular storage policy in an automated manner without involving laborious manual design and coding to provision storage.

Referring now to the figures, FIG. 1 depicts an example computing system 100 that supports and participates in a container environment 120. The computing system 100 includes a processing resource 102 that may include a microcontroller, a microprocessor, central processing unit core(s), an application-specific integrated circuit (ASIC), a field programmable gate array (FPGA), etc. The computing system 100 includes a machine readable medium 104 that may be non-transitory and include random access memory (RAM), read-only memory (ROM), electrically erasable programmable read-only memory (EEPROM), flash memory, a hard disk drive, etc.

The processing resource 102 may execute instructions 105 (i.e., programming or software code) stored on machine readable medium 104 to perform functions of the computing system 100, such as providing a container orchestrator 122 and a containerized storage system 130, as will be described further below. More particularly, each of the components of the containerized storage virtualization system 130 may be implemented as executable instructions 105, including the data services provider 134, storage virtualizer 136, volume manager 138, adapters 139, policy engine 142, and container storage interface API 144. Containerized applications 124, 126 and container storage interface plug-ins 128 also may be implemented as instructions included in executable instructions 105. Additionally or alternatively, the processing resource 102 may include electronic circuitry for performing the functionality described herein.

The computing system 100 may also include other hardware components, such as physical storage 106. Physical storage 106 may include any physical storage device, such as a hard disk drive, a solid state drive, or the like, or a plurality of such storage devices (e.g., an array of disks), and may be locally attached (i.e., installed) in the computing system 100. In some implementations, physical storage 106 may be accessed as a block storage device.

In some cases, the computing system 100 may also include a local file system 108, which may be implemented as a layer on top of the physical storage 106. For example, an operating system 107 may be executing on the computing system 100 (by virtue of the processing resource 102 executing certain instructions 105 related to the operating system) and the operating system 107 may provide a file system 108 to store data on the physical storage 106.

The computing system 100 may be in communication with other computing systems, such as computing system 110, via a wired and/or wireless network for example. The other computing systems may be similar to the computing system 100, and may each include at least a processing resource and a machine readable medium. The computing systems 100 and 110 may each execute software (i.e., processing resource 102 executes certain instructions 105) to deploy nodes of a container orchestrator 122. In other words, the container orchestrator 122 may have a cluster architecture that includes the container orchestrator nodes of computing systems joined in a cluster. The container orchestrator 122 acts as a platform for deploying and managing containerized applications across the cluster of computing systems. The container orchestrator 122, containerized applications deployed therefrom, and other container resources (such as container storage) are deemed to be within a container environment 120. By contrast, other elements may function outside the container environment 120, such as the local file system 108 and an operating system 107 of the computing system 100.

In FIG. 1 for the purposes of illustration, containerized applications 124 and 126 are deployed via the container orchestrator 122 locally on computing system 100. Thus, it may be said that the applications 124, 126 are remote to other nodes, such as computing system 110. The containerized applications 124, 126 may represent microservices, user applications, or the like. The container environment 120 may also host containerized applications (not shown) local to other computing systems in the cluster.

The container orchestrator 122 also deploys a containerized storage virtualization system 130, which will be described in more detail below. In the example of FIG. 1, the containerized storage virtualization system 130 is also executing locally on the computing system 100 and processing resource 102 thereof. In some implementations, other containerized storage virtualization systems of other computing systems in the cluster are also included in the container environment 120, although they are not depicted in FIG. 1. For example, the containerized storage virtualization system 130 may serve as a node in a storage virtualization platform having a cluster architecture, where multiple containerized storage virtualization systems (at least some of which may be executing on different and separate physical computing systems) cooperate to store and manage data in a storage virtualization layer.

The container orchestrator 122 may also include a standardized container storage interface 123. The container storage interface 123 has a plug-in architecture and can provision storage in the form of a persistent volume from a storage source using a corresponding one of a plurality of available container storage interface plug-ins 128. To "provision" storage may refer to the process of allocating a certain amount of storage capacity and making that allocation available to a consumer. Plug-ins 128 may be provided by various vendors and may expose an associated storage system to the container storage interface 123. Non-limiting examples of plug-ins include a block protocol plug-in (e.g., based on Internet Small Computer Systems Interface or iSCSI protocol), a file protocol plug-in (e.g., based on Network File System or NFS protocol, Common Internet File System or CIFS protocol, Server Message Block or SMB protocol), a public cloud persistent volume plug-in, and other plug-ins based on any other storage type (e.g., custom drivers). For convenience, individual ones of the plug-ins 128 may be referred to herein as a plug-in 128 (e.g., a block protocol plug-in 128 or a file protocol plug-in 128). A plug-in 128 may undergo an installation and setup process in the container environment 120 as required for that plug-in (e.g., populating credentials or other configuration details). In some cases, one or more of the plug-ins 128 may be running as a containerized application. However, a persistent volume provisioned through the plug-in 128 may be limited to a single type of storage corresponding to that plug-in. In contrast, the containerized storage virtualization system 130 disclosed herein advantageously may be useful for creating persistent volumes that blend multiple underlying storage types.

The containerized storage virtualization system 130 (also referred to as storage virtualization system 130) runs within one or more containers, and may be implemented in executable instructions 105. As will become evident, the storage virtualization system 130 provides an extra storage virtualization layer between a requesting application and one or more allocations of storage provisioned through the container storage interface 123. The storage virtualization system 130 includes a data path 132 and a control plane 140. The data path 132 includes data services provider 134, storage virtualizer 136, and a volume manager 138. The data path 132 also may include storage adapters 139 for accessing local storage (i.e., storage on the same computing system 100 on which the storage virtualization system 130 is hosted), such as a block adapter for mounting local physical storage 106, stacked file and block adapters for accessing local file system 108 as a block device, or other storage adapters.

The control plane 140 includes a policy engine 142 and a container storage interface API (application programming interface) 144. During an initialization phase of the storage virtualization system 130, the control plane 140 may receive from an administrator or the container orchestrator 122 a list of available container storage interface plug-ins 128 in the container environment 120. The control plane 140 may also acknowledge the storage adapters 139 available to the data path 132 for mounting local storage. The control plane 140 may also maintain a list of characteristics of the storage associated with each of those available plug-ins 128, such as performance characteristics (e.g. latency, IOPS or Input/Output Operations per Second, etc.), security characteristics (e.g., encryption, isolation, etc.), data protection characteristics (e.g., available RAID, or redundant array of independent disks, levels), cost characteristics (e.g., dollar per GB), or other characteristics.

The functionality of the data path functions 132 and control plane functions 140 will now be described in the context of providing storage to containerized applications 124, 126. A containerized application, such as application 124 may request storage from the container orchestrator 122. For example, the application 124 may need a persistent volume to store data. In some implementations, the application 124 may pass one or more requirements with the request, such as a capacity requirement, a performance requirement (e.g., latency, IOPS, etc.), a data protection requirement (e.g., RAID level), a cost requirement (e.g., dollar per GB), a security requirement, a tiering requirement (e.g., specified amounts of hot and cold storage), or other requirement. In some implementations, the container orchestrator 122 may maintain a storage abstraction called an orchestrator persistent volume in response to the request.

The container orchestrator 122 may use the container storage interface 123 to send the request to the storage virtualization system 130 through the container storage interface API 144 of the control plane 140 (with interface 144 acting as a server). In this manner, containerized storage virtualization system 130 may be understood to act as a storage provider to container orchestrator 122. In some implementations, the control plane 140 may assign an identifier to the request, such that each request can be individually identified, particularly with respect to the storage that will be provisioned for each request in the manner described herein.

The policy engine 142 of the container orchestrator 122 analyzes the request to determine what types of storage meet the requirements of the request. For example, the control plane 140 may have one or more of the following types available for storage provisioning: the physical storage 106, the local file system 108, a remote storage system 160, a virtualized storage 162, or public cloud storage 164. Additionally, more than one of any of the types of storage depicted may exist, but are not shown for clarity of illustration. For example, multiple remote storage 160 may be available from which to provision allocations of storage.

Remote storage system 160 as depicted in FIG. 1 may represent either a file system (e.g., a network-attached storage, or NAS, file server), block storage system (e.g., a storage area network, or SAN, storage device), or any other type of storage system that is remote to the computing system 100 and thus remote to the containerized storage virtualization system 130. For example, being remote may mean that the computing system 100 communicates with the remote storage system 160 via a network connection or the like.

Virtualized storage 162 may represent any existing persistent volume in a virtual environment, such as a persistent volume in the container environment 120 including container storage provisioned through the container storage interface 123 independent of the containerized storage virtualization system 130. In some examples, virtualized storage 162 may represent container storage provisioned by another container storage virtualization system other than system 130 (e.g., hosted on a different node than computing system 100). In some examples, virtualized storage 162 may represent storage provided by a virtual machine or hypervisor based software-defined storage platform.

The policy engine 142 may determine a mix of the foregoing storage types. For example, the policy engine 142 may compare the request to the available storage types to identify, a closest match. To illustrate, the request may ask for certain amount of high speed storage and a certain amount of low cost, archival class storage. The policy engine may determine that physical storage 106 meets the high speed storage requirement (e.g., due in part to locality and being a high speed media in this example) and a block storage device 160 meets the low cost, archival class requirements. Additional example implementations of the policy engine 142 are described further herein, with respect to FIG. 2 for example.

Subsequently, the control plane 140 utilize the adapters 139 and/or container storage interface plug-ins 128 to provision each storage type in the determined mix and to acquire a mount point for each provisioned storage. A mount point allows access to the provisioned storage by a consumer, such as the data path 132 as will be described below.

As an example of local provisioning, the control plane 140 may use a block adapter from the adapters 139 to provision an allocation from physical storage 106 and acquire a local block mount point 170 (e.g., local host device mount point) to access that allocation. As another example, the control plane 140 may use stacked file and block adapters to provision an allocation from the local file system 108 and to acquire a local file system mount point 172 to access that allocation as a block device (i.e. "file as block device").

To provision storage via the plug-ins 128, the control plane 140 via the container storage interface API 144 communicates with the storage interface 123 to request that a plug-in 128 provision an allocation from its associated storage and provide a mount point back to the control plane 140. As an example, presuming the remote storage system 160 represents a remote block device (e.g., a SAN storage array external to the computing system 100), the control plane 140 may request (via 144 and 123) that a block protocol plug-in 128 (e.g., based on iSCSI protocol) provision an allocation from the block-type remote storage system 160 and provide a remote volume mount point 174 (e.g., iSCSI target and LUN, or Logical Unit Number) to access that allocation. As another example, the remote storage system 160 may represent a remote file device (e.g., a NAS file server), and the control plane 140 may request (via 144 and 123) that a file protocol plug-in 128 (e.g., based on NFS protocol) provision an allocation from the file-type remote storage system 160 and provide a remote volume mount point 174 (e.g., an IP address and export name under NFS) to access that allocation. In some implementations, the control plane 140 may utilize a block protocol plug-in 128 to provision from physical storage 106 or utilize a file protocol plug-in 128 to provision from the local file system 108, instead of using an adapter 139.

As another example of provisioning by way of a plug-in, the control plane 140 may request (via 144 and 123) that a plug-in 128 matching the virtualized storage 162 provision an allocation from the virtualized storage 162 and provide a virtualized storage mount point 176 to access that allocation. As another example, the control plane 140 may request (via 144 and 123) that a public cloud plug-in 128 provision an allocation from the public cloud storage 164. In return, the public cloud plug-in 128 may provide a public cloud persistent volume mount point 178 to access that allocation.

Although FIG. 1 depicts a local block mount point 170, a local file system mount point 172, a remote volume mount point 174, a virtualized storage mount point 176, and a public cloud persistent volume mount point 178, more or fewer mount points and mount points of any combination may be requested by the control plane 140 and acquired via the adapters 139 or plug-ins 128. In various instances, multiple local block mount points 170, multiple local file system mount points 172, multiple remote volume mount points 174, multiple virtualized storage mount points 176, and/or multiple public cloud persistent volume mount points 178 may be requested and acquired by the control plane 140. Moreover, the storage system 160 and the remote mount point 174 may represent respectively one or more of the same or different types of remote storage and a mount point thereof, including block, file, or other types of remotely accessible storage. The particular combination of storage mount points requested and acquired by the control plane 140 may depend on the storage request from the containerized application 124, and more particularly, may depend on the handling of that storage request by the policy engine 142.

Once the one or more storage mount points (e.g., 170, 172, 174, 176, or 178) have been acquired by the control plane 140 in accordance with the policy engine 142, the control plane 140 passes the acquired mount points to the data path 132. The control plane 140 may identify the mount points as being associated with a particular request, by associating the mount points with the request identifier for example. As will be described, the data path 132 consumes and blends the mount points to create a virtual persistent volume 156 presented by a mount point 180 to the requesting containerized application 124. In this manner, the allocated storage corresponding to the acquired mount points (e.g., 170, 172, 174, 176, or 178) may be referred to as the underlying storage of the virtual persistent volume 156. The containerized application 124 thus reads and writes data to the virtual persistent volume 156. Before describing the creation of the virtual persistent volume 156, operational aspects of the data path 132 will first be described.

The data path 132 includes storage virtualizer 136, which maintains an object-based storage virtualization layer 150. A purpose of the storage virtualization layer 150 is to decouple where data is stored (i.e., storage allocations accessed via the mount points 170, 172, 174, 176, and/or 178) from how data is presented to a consumer of the data (e.g., containerized application 124). In this manner, data services such as migration, backup, snapshotting, replication, deduplication, compression, and others, may be performed on any mix of underlying storage and with decreased, minimal, or even no disruption to a consumer of the data.

An aspect of the storage virtualization layer 150 is that the storage virtualizer 136 stores data as "objects" in an object store 152. More particularly, the object store 152 may store different types of objects, including data objects and metadata objects. Data related to the containerized application 124, including files and/or directories, is made up of one or more data objects. Metadata objects may, among other things, be useful for organizing the data objects in a useful and orderly manner, as will be described below. In some implementations, each data object in the object store may be a fixed amount of data, such as 4 or 8 kibibytes of data for example, and metadata objects may also be a fixed amount of data, such as 1 kibibyte.

An object-based storage virtualization layer 150 may be different from block level storage (e.g., implemented in a SAN and presented via a storage protocol such as iSCSI or Fibre Channel) and file level storage (e.g., a file system which manages data in a file hierarchy and is presented via a file level protocol such as NFS or SMB/CIFS), although the object-based storage virtualization layer 150 may underlie block or file level storage protocols (e.g., by abstraction via mount points 180, 182 as will be described).

The storage virtualizer 136 maintains an object index 154, which tracks, for each object (data object and metadata object) in the object store 152, a signature, a physical address, and a reference counter. The signature of an object may be a cryptographic digest of the content of that object, using a hash function such as SHA-1, SHA-256, MD5, etc. Thus, the signature may also be referred to as a content-based signature. The reference counter in the object index 154 refers to the number of times the associated object is referenced across all the virtual persistent volumes (including 156, 158) in the storage virtualization layer 150.

The physical address in the object index 154 refers to the actual physical location of the object. In some examples, while the object store 152 may be understood to be a storage construct for describing the storage of objects within the storage virtualization layer 150, it may also be understood that the objects are stored physically on the underlying storage at the physical address. Because the data path 132 can consume multiple storage mount points, the particular mount point may be a part of the physical address. Additionally, the physical address may include a location within the storage allocation of a given mount point. For example, if the mount point pertains to physical storage 106, the physical address may include a logical block number. If the mount point pertains to public cloud storage 164, the physical address may include a reference to a cloud object in the syntax of the corresponding hosting provider. The volume manager 138 is configured to perform data reads and writes to specified physical addresses, such as the physical addresses stored in the object index 154.

In some implementations, the containerized storage virtualization system 130 may utilize an additional layer of indirection between the object index 154 and the actual physical location of objects. In such implementations, the volume manager 138 may assign and/or divide the underlying storage allocations at each mount point provided by the control plane 140 into extents (or also referred to as mini-volumes). The additional layer of indirection may be implemented by storing a virtual address instead of a physical address in the object index 154 in association with an object signature and maintaining an extent table that maps a given virtual address to an extent and thus the corresponding underlying storage. Thus, to access an object based on a virtual address, the volume manager 138 can first identify the extent targeted by the virtual address using the extent table and a first portion of the virtual address, and then locate the object within the extent using a second portion of the virtual address. In this manner, certain data services such as migration and tiering between extents may be performed in an efficient manner by updating just extent identifiers in the extent table, rather than updating a large amount of in-memory or persisted references to the data objects (i.e., each affected address in the object index 154) and regenerating various logical addresses, indexes, and other data structures utilized in managing the storage system.

Within the storage virtualization layer 150, the storage virtualizer 136 maintains one or more virtual persistent volumes backed by the object store 152. In some implementations, a containerized application will be associated with a virtual PV in a one-to-one relationship. For example, in the example illustration of FIG. 1, containerized application 124 is associated with virtual PV 156, and containerized application 126 is associated with virtual PV 158. In some implementations, each virtual PV is mapped by the container orchestrator 122 to a corresponding orchestrator persistent volume maintained by the container orchestrator 122, and the requesting containerized application 124 accesses the storage of the virtual PV 156 is accessed by via the orchestrator persistent volume.

In other cases, containerized applications and virtual PVs may be associated in one-to-many, many-to-one, or many-to-many relationships. For the sake of illustration only, virtual PVs will now be described with reference to virtual PV 156, although it should be understood that like description may apply to other virtual PVs such as virtual PV 158 and other virtual PVs not shown.

In an implementation, virtual persistent volume 156 may be an organization of metadata objects and data objects stored in the object store 152, where the organization hierarchically relates the data objects by associated content-based signatures up to a root object. In an example, the virtual PV 156 may be a Merkle tree (also referred to as a hash tree) or any other hierarchical arrangement (e.g., directed acyclic graphs, etc.). In the case of a hierarchical Merkle tree, data objects may be located at the lowest tree level of any branch (also referred to as the leaf level, which is most distant from the root object) and such data objects may be referred to as leaf data objects. As described above, data objects make up the data of the containerized application 124, such as files and directories.

Within the hierarchical arrangement, a parent object refers to an object that includes as its content the signatures of child objects. For example, a parent object of leaf level data objects is a metadata object that stores as its content the signatures of its child leaf level data objects. In this manner, the signatures of objects at each level are collected in parent objects at a next level higher in the hierarchical arrangement until the root object is reached. Thus, the root object also is a metadata object that stores as content the signatures of respective child objects. From another perspective, the hierarchical arrangement expands in a direction from the root object to the leaf level—a metadata object at any given level may expand to a number of child nodes dictated by a predefined branching factor. A metadata object may be able to store a quantity of signatures that is at least equal to a branching factor of the hierarchical arrangement, so that it may hold the signatures of all child objects.

Any change in the data of the virtual PV (i.e., new data, modified data, deleted data) translates to a change in the content of one or more leaf level data objects, which will precipitate a change in the content-based signatures of those changed data objects, which will cause content and signature changes to propagate through parent nodes upward to the root object. Thus, a virtual PV 156 at a given point in time (also referred to as a snapshot in time) may be identified uniquely by its root object, and more particularly, identified by its root object signature.

Another aspect of virtual PV 156 is that, in some implementations, a given file or directory from among the containerized application 124 may be stored in a corresponding subtree arrangement within the virtual PV 156. In other words, the virtual PV 156 may be delineated into subtrees, each of which correspond to a respective file or directory of the containerized application 124.

Because files and directories are made up of one or more data objects and those data objects are arranged in the virtual PV 156 and subtrees thereof by reference to associated data object signatures, in some implementations each of the data objects may be physically stored just once in the object store 152 and referred to by their respective signatures in multiple metadata objects in the virtual PV 156 or in any other virtual PV (e.g., 158) in the storage virtualization layer 150. Thus, data may be deduplicated in this manner by the storage virtualizer 136. Similarly, metadata objects can be stored once and referred to multiple times by corresponding signatures. The number of times a data object or metadata object is referenced in the storage virtualization layer 150 may be recorded in the corresponding reference counters of the object index 154. In some implementations, deduplication of data may be performed inline during a write operation, in contrast to post-processed or near-line deduplication, and in this manner, storage of data may be described as natively deduplicated in the storage virtualization layer 150 and among the virtual PVs 156, 158.

In use cases where security is a consideration, including multi-tenancy scenarios, separate object stores may be utilized for each sensitive security domain. Thus, sensitive data may be isolated to a secured object store without participating in the deduplication of other virtual PVs not within the security domain.

In order for the containerized application 124 to access the virtual PV 156, the data path 132 may provide a mount point 180. The data path 132 can provide any type of mount point from a plurality of types of mount points, including without limitation, a block type mount point (e.g., iSCSI compatible), a file type mount point (e.g., a Filesystem in Userspace or FUSE interface, or NFS, SMB, or CIFS compatible), a key/value share mount point (e.g., a noSQL volume or an Amazon S3 compatible API), and other types of mount points. In this manner, the mount point may be understood to contribute to complete storage access abstraction, because the containerized application 124 is provided with whatever type of storage access is required by the containerized application 124 (e.g., file protocol or block protocol, etc.) regardless of the underlying type of storage that makes up the virtual PV 156 (e.g., regardless of software-based or hardware-based, block or file, local or remote, etc.).

The type of mount point, that is, the type of abstraction, may be user selected or may be predefined according to the containerized application 124 requesting the storage (i.e., based on a class of containerized application, dictated by the container orchestrator 122, etc.). The type of abstraction may be indicated to the containerized storage virtualization system 130 via the storage request received at the control plane 140.

In the example of FIG. 1, the containerized storage virtualization system 130 also may provide a mount point 182 to containerized application 126 to access a virtual persistent volume 158 created in response to a request for storage from the containerized application 126 to the container orchestrator 122, in a manner similar to that described above for the mount point 180 of virtual PV 156 for containerized application 124. The virtual PVs 156 and 158 may both include respective Merkle trees for organizing respective sets of data, while the object store 152 stores the data of both virtual PVs 156 and 158 in a deduplicated manner.

In operation (i.e., after the virtual PV 156 is created and mount point 180 provided to application 124), the storage virtualization system 130 may service input/output (I/O) requests from the containerized application 124 directed to a virtual PV 156 via the mount point 180. For example, to serve a read request received through the mount point 180, the storage virtualizer 136 may identify the signatures of data objects in the virtual PV addressed by the read request (i.e., which may include walking the Merkle tree structure of the virtual PV based on an address of the read request) and determine the physical addresses of those data object signatures from the object index 154. In some implementations, the physical address of a data object may specify the mount point of the underlying storage allocation where the data object is stored (e.g., one or more of mount points 170, 172, 174, 176, or 178). The storage virtualization system via the volume manager 138 may then read the data objects using the physical addresses (or using a virtual address and extent map as described above) and return the read data to the containerized application 124 through the mount point 180.

To serve a write request, the storage virtualizer 136 may, in example implementations, receive the data to be written to the virtual PV 156 from the containerized application 124, check whether the data includes any data objects that are new to the object store 152 based on content-based signatures, and write to the object store the new data objects (i.e., data objects that do not already exist in the data store). In some implementations, the storage virtualizer 136 may compress the new data objects before writing to the object store 152. The process of writing to the object store 152 in particular may involve controlling to which underlying storage allocation (e.g., 106, 108, 160, 162, or 164) the new data objects are written. In some implementations, the containerized application may indicate in the write request to which underlying storage allocation to write the data. In some implementations, new data may be written by default to a local storage portion of the virtual PV 156, such as locally attached physical storage 106, which may provide "hot" tier storage optimized for frequent access. In some implementations, the containerized application may indicate a particular policy or service level agreement for writing the data and the storage virtualization system may determine which underlying storage allocation meets that policy or SLA. The storage virtualization system then utilizes the mount point (e.g., 170, 172, 174, 176, or 178) corresponding to that underlying storage allocation to write the data objects. The storage virtualization system also adds the signature of data objects to metadata objects of the virtual PV 156.

Representing data in a virtual PV 156 that is natively deduplicated and uniquely identified by a root object signature may enable efficient data services, including those provided by data services provider 134. For example, data services provider 134 may perform, without limitation, snapshot-based back up, replication, migration, tiering, redundancy-based data protection (e.g., redundant array of independent nodes, also referred to as RAIN; or RAID), or other capabilities. The data services provider 134 may perform the data services with the virtual PV 156 in a manner that is transparent or non-disruptive to the containerized application 124. For example, the data services can be performed without modifying the mount point 180 and in the case of some data services, without input or instruction (e.g., configuration details, set up commands, etc.) from a user, the containerized application 124, or the container orchestrator 122. Moreover, in some examples, the data services provider 134 may manipulate data primarily at the storage virtualization layer 150, such that the data services are performed in a manner that is irrespective of the different underlying storage mounts and the particular composition of the virtual PV 156. In other words, the data services provider 134 can consistently perform a common set of data services regardless of what type of underlying storage makes up the virtual PV 156 in a non-disruptive manner. The foregoing technical benefits may be made possible by virtue of, for example, the virtual PV 156 decoupling the underlying storage from the containerized application 124.

For example, data services provider 134 may perform an efficient snapshot-based backup data service. In some implementations, the difference between snapshots in time of a hierarchically arranged virtual PV 156 can be efficiently accomplished by comparing object signatures in a top-down iterative manner starting at the root object to find metadata and data objects that differ. For example, in an operation to back up a current state of the virtual PV 156 (i.e., a current snapshot), the current snapshot may be on a primary system (e.g., computing system 100) and an older, previously backed up, snapshot may already exist on a backup system (e.g., computing system 110). In that example, the difference between the current snapshot and the older snapshot may be determined by comparing signatures of the snapshots in the previously described manner, and the backup system may be searched to determine if the metadata or data objects that differ already exist on the backup system (i.e., in an object store of the backup system). Only those metadata or data object that do not exist are copied from the primary system to the backup system, thus reducing the amount of data traffic and improving backup times. In other implementations, snapshot-based backups may be made on the same primary system instead of or in addition to the backup system in a similar manner.

The snapshot-based backup may be performed on a scheduled basis for example, without disrupting the containerized application 124. Moreover, the snapshot-based back up may be performed primarily at the software virtualization layer 150, thus avoiding complexities of managing each individual underlying storage directly. Similar to the backup process, a restoration process may also proceed with a comparison of the metadata or data objects to be restored and the objects already existing on the restoration target, and a transmission of only that data that does not exist on the restoration target.

The data services provider 134 may also perform a migration operation. The migration may move data objects between different ones of the underlying storage within a virtual PV 156, including between different local storage, between local and remote storage, between different remote storage, between different public cloud storage, between public cloud storage and non-public cloud storage (either local or remote), or between other combinations of underlying storage. The migration is handled at the storage virtualization layer 150 by associating the new physical address of a moved data object to the unchanged content-based signature in the object index 154, thus making the migration transparent to the containerized application 124.

As another example, the data services provider 134 may migrate the virtual PV 156 to a different computing system. For example, in some cases, it may be useful to migrate a virtual PV 156 to be close to a workload using the virtual PV 156. In an example scenario, the container orchestrator 122 may move the containerized application 124 to a different computing system (e.g., from source computing system 100 to destination computing system 110) for the sake of load balancing or another reason, and the virtual PV 156 may need to be migrated to be close to the containerized application 124. In some implementations, the storage virtualization system 130 may migrate management of the virtual PV 156 to another storage virtualization system on the destination computing system 110 to which the containerized application 124 was migrated. The data services provider 134 may also migrate some of the data in the virtual PV 156, such as migrating data objects that were local to the computing system 100 (e.g., on underlying physical storage 106) to the physical storage of the different computing system 110, which may be useful for maintaining storage locality and other performance characteristics of the virtual PV 156. Such migration may involve identifying whether the destination computing system 110 already has a copy of metadata or data objects to be migrated, and transmitting only data objects that do not exist on the destination computing system 110. At the same time, the same mount point 180 may be maintained and undisrupted for the containerized application 124.

The data services provider 134 may also perform data tiering within a virtual PV 156, that is, moving data between different types of underlying storage that may offer different characteristics and comply with different storage policies. For example, tiering may be implemented by virtue of assigning and/or dividing the constituent storage allocations of the virtual PV 156 to different extents, as previously described. Under certain triggering conditions, the data services provider 134 (in conjunction with the volume manager 138 in some implementations) may move data objects from one extent to a different extent, and update the extent table accordingly. Example triggering conditions may include an increased security status of data which may cause the data services provider 134 to move that data from public cloud storage 164 to non-cloud storage 106, 108, 160, or 162; aging of data which may cause the data services provider 134 to move that data to an archival class of storage (e.g., remote storage 160); recent frequent access of data which may cause the data services provider 134 to move that data to high performance storage (e.g., local physical storage 106); or other types of conditions. By virtue of moving and managing data at the storage virtualization layer 150, data tiering may be performed across any type of underlying storage and without disrupting the mount point 180 or containerized application 124.

The data services provider 134 may also support redundancy based data protection. For example, the data services provider 134 may provide RAID data protection. For example, the data services provider 134 (in conjunction with the volume manager 138 in some implementations) may create a RAID set across underlying storage allocations or within an underlying storage allocation (e.g., in cases where local physical storage 106 includes a set of drives). The data services provider 134 may feature a software RAID controller or cooperate with a hardware RAID controller to write objects of the virtual PV 156 to the RAID set according to a RAID scheme such as RAID 1, RAID5, or RAID 6.

The data services provider 134 also may provide RAIN data protection by replicating or mirroring data of a virtual PV 156 (also referred to as a primary virtual PV for ease of discussion) for data protection and high availability purposes in keeping with RAIN architecture principles. In some implementations, the data services provider 134 may replicate or mirror data at inception when the data comes in to the storage virtualization layer 150 as a write request from the containerized application 124. In some implementations, the replicated data may form a virtual PV replica, which may have a form similar to a virtual PV (e.g., including a Merkle tree) and may be managed by and local to a different storage virtualization system on a different computing system 110, relative to the primary virtual PV that is local to computing system 100. Additionally or alternatively, the virtual PV replica may be made up of underlying storage that is different and/or separate from the underlying storage that makes up primary virtual PV 156. Thus, if data on the primary virtual PV is unrecoverable, the data may be restored from the virtual PV replica using a failover procedure.

To summarize, by virtue of a containerized storage virtualization system 130 aggregating various types of storage into a virtual persistent volume that can be presented as any number of available storage abstractions, the container storage data path can be highly virtualized from end to end. Thus, users of containerized applications may be afforded a high degree of flexibility in requesting any composition of underlying storage to suit performance needs (or other needs) of an application while also being able to consume the storage using any type of abstraction suitable for the application. Moreover, a consistent set of storage services may be provide regardless of the composition of underlying storage and regardless of the type of storage access abstraction used to present the virtual PV.

Figure 2:
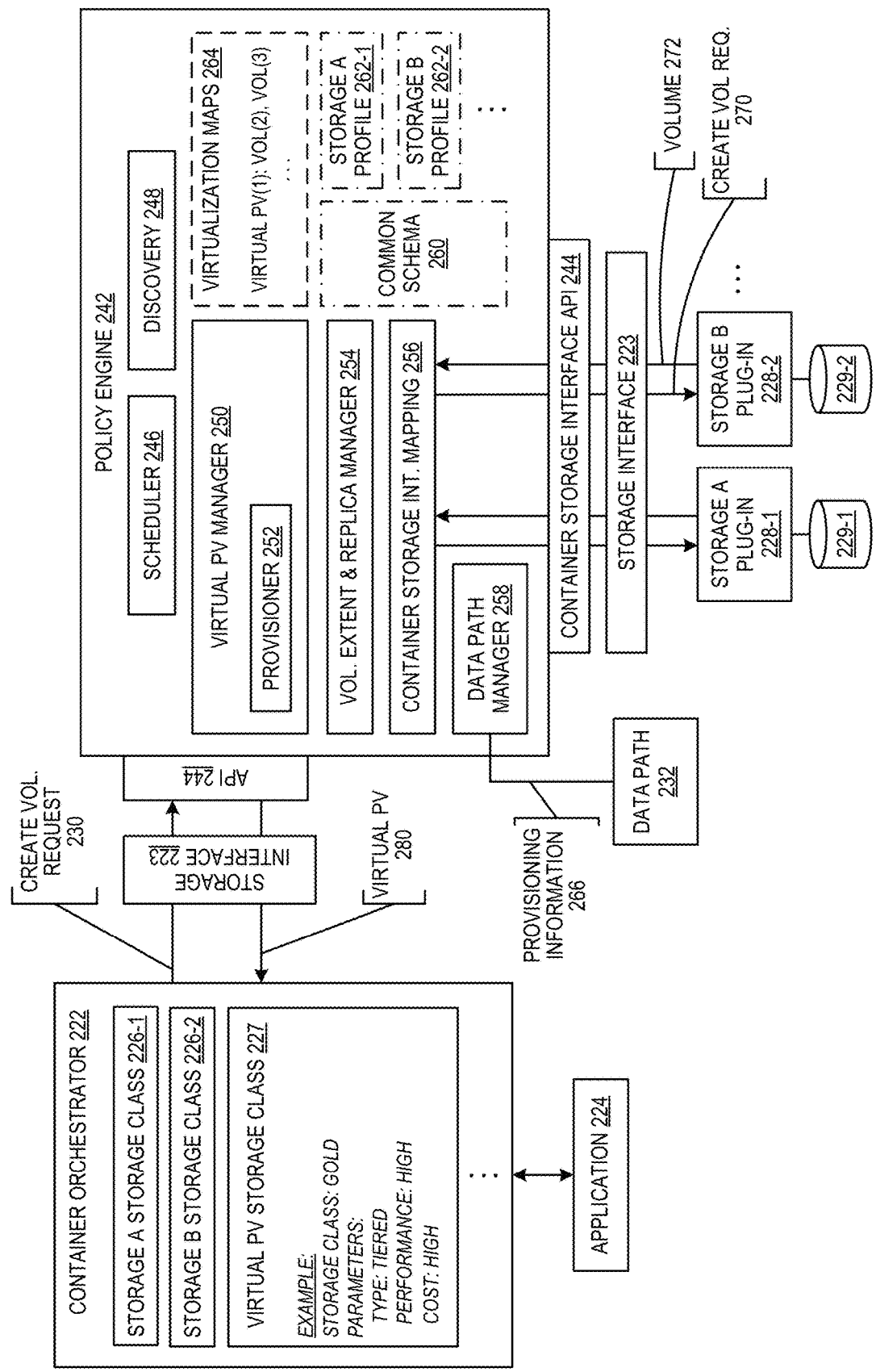
FIG. 2 depicts an example system that presents a virtual persistent volume storage class including parameters describing an associated virtual storage policy.

FIG. 2 depicts an example system that includes a policy engine 242. FIG. 2 also depicts other elements, including a container orchestrator 222, a container storage interface 223, an application 224, a data path 232, a container storage interface API 244, and one or more storage plug-ins (e.g., a storage plug-in A 228-1, a storage plug-in B 228-2). In some implementations, the foregoing elements of FIG. 2 may be deemed to exist within a same container environment. The policy engine 242 and elements of FIG. 2 (i.e., 222, 223, 224, 232, 244, 228-1, 228-2) may each be implemented as hardware or any combination of hardware and programming to implement their respective functionalities as described herein. For example, the programming may be processor executable instructions stored on a non-transitory machine readable medium and the hardware may include a processing resource to retrieve and/or execute those instructions. For example, the machine readable medium and the processing resource may be analogous in many respects to the machine readable medium 104 and the processing resource 102 of FIG. 1, respectively. Hardware may also include electronic circuitry or logic.

The container orchestrator 222 may be analogous in many respects to the container orchestrator 122 described above, and may serve as a platform for deploying and managing containerized applications, such as application 224, which may be similar to applications 124, 126 described above. The container orchestrator 222 may include a container storage interface 223, which may be analogous to container storage interface 123 described above. The container storage interface 223 may enable a plug-in to expose a storage system to the container orchestrator 222 and an associated container environment. For example storage A plug-in 228-1 may expose storage system 229-1 to the container orchestrator 222, and storage B plug-in 228-2 may expose storage system 229-2 to the container orchestrator 222. The plug-ins 228-1 and 228-2 (also referred to generally as plug-in(s) 228) may be similar to plug-ins 128 described above, and the storage systems 229-1 and 229-2 (also referred to generally as storage, storage type(s), or storage system(s) 229) may be local storage devices (e.g., locally attached disk drives), local or remote storage arrays, software-defined storage, cloud storage, or the like, and may be similar to any of the storage systems or storage types described above, such as the physical storage 106, the local file system 108, the remote storage system 160, the virtualized storage 162, or the public cloud storage 164.

For a storage plug-in 228 that is deployed at the container orchestrator 222, the container orchestrator 222 may maintain an object called a storage class that include parameters (e.g., in the form of key/value pairs) describing the associated storage 229. A storage class may describe characteristics of the storage being offered (e.g., provisionable as a persistent volume), and may describe quality of service levels, backup policies, capacity, cost, performance (e.g., IOPS, latency), redundancy, recovery time objective (RTO), recovery point objective (RPO), or other measures. Different storage classes may describe different storage offerings. In some instances, a storage 229 associated with one vendor may have multiple storage classes. Different storage 229 from different vendors may have different storage classes. Storage classes may be non-standardized, between vendors or even within a vendor, since different storage classes may use different parameters. In FIG. 2, storage A plug-in 228-1 may have at least one associated storage A storage class 226-1, and storage B plug-in 228-2 may have at least one associated storage B storage class 226-2. Storage classes, such as storage A storage class 226-1 and storage B storage class 226-2, may be referred to herein generally as storage class(es) 226. Although two storage plug-ins 228 and two storage systems 229 are depicted in FIG. 2 as an example, more or fewer plug-ins and/or storage systems may be present and available in various implementations.

In some implementations, the policy engine 242 may form at least part of a storage virtualization system. For example, the policy engine 242 may serve as or form part of the containerized storage virtualization system 130 of FIG. 1, and more particularly, may serve as or form part of the control plane 140 and/or the policy engine 142 of FIG. 1. As will be described, the policy engine 242 may be useful for, among other things, virtualizing control plane operations to provide applications (e.g., application 224) with a virtual persistent volume backed by one or more types of available storage to meet a policy goal, despite the available storage types being described by non-standardized storage classes.

The policy engine 242 may include and/or interact with one or more elements that each may be implemented as hardware or any combination of hardware and programming to implement their respective functionalities as described herein. In some implementations, the policy engine 242 may include a scheduler 246, a discovery agent 248, a virtual PV manager 250 that includes a provisioner 252, a volume extent and replica manager 254, a container storage interface mapping 256, and/or a data path manager 258. In some implementations, the policy engine 242 may communicate with the container storage interface 223 (for example, communicate bidirectionally) via a container storage interface API 244, which may be analogous to container storage interface API 144 described above. In some implementations, the policy engine 242 may communicate with a data path 232, which may be analogous to the data path 132 described above.

The discovery agent 248 ay determine what plug-ins 228 and associated storage 229 are available in the container environment. Additionally, the discovery agent 248 may retrieve storage classes 226 corresponding to the discovered plug-in(s) 228 and storage 229 and register the retrieved storage classes 226 to the policy engine 242. For example, the discovery agent 248 may collect the foregoing information about plugins 228, storage 229, and storage classes 226 by querying the container orchestrator 222 or container storage interface 223.

In some implementations, the discovery agent 248 may operate at start up or during an initialization phase of a storage virtualization system to which the policy engine 242 belongs and/or may operate periodically while the storage virtualization system is running. As an illustration, a non-limiting example of a container environment may include three to six types of storage plug-ins 228. In various implementations, there may be one or more storage classes for each plug-in 228.

The storage classes 226 registered by the policy engine 242 may be non-standardized, as discussed above. In other words, different storage classes may use different parameters, or more specifically, different keys and/or different values for parameters defined as key/value pairs. The policy engine 242 may utilize a common schema 260 to translate each storage class 226 into a corresponding storage profile. For example, storage A storage class 226-1 may be translated into storage A profile 262-1, and storage B storage class 226-2 may be translated into storage B profile 262-2. Storage profiles, such as storage A storage profile 262-1 and storage B storage profile 262-2, may be referred to herein generally as storage profile(s) 262. In some implementations, the common schema 260 may be manually coded, based on administrator knowledge of the storage classes 226 for example. The common schema 260 may be understood to be a mapping between vendor specific storage class parameters and a common language. In some implementations, as will be described below, the common language of the common schema 260 may be designed in correlation with the creation of virtual PV storage class 227. In some implementations, the storage profiles 262 may be static, in that they are not expected to change after the translation.

To illustrate, the common schema 260 may be useful if a same performance level in storage A storage class 226-1 and storage B storage class 226-1 have values of A and B respectively, and thus are translated into a same performance level value X in storage A profile 262-1 and storage B profile 262-2. Thus, storage profiles 262-1 and 262-2 (translated from storage classes 226-1 and 226-2 respectively) use a common language to describe storage offerings for storage 229-1 and 229-2, respectively.

The policy engine 242 may also present or publish one or more virtual PV storage classes 227 to the container orchestrator 222. The virtual PV storage class 227 may be exposed to users, alongside storage classes 226. Similar to storage classes 226, the virtual PV storage class 227 may describe characteristics of a provisionable persistent volume, and in particular, a persistent volume provisionable from the policy engine 242 or from a storage virtualization system that includes the policy engine 242. Different virtual PV storage classes 227 may be presented or published to the container orchestrator 222, such as storage classes for different service levels, such as gold, silver, and bronze, each with different parameters. For example, each of the different virtual PV storage classes 227 may be designed by an administrator for different virtual storage policy purposes or may be predefined by a vendor providing the policy engine 242. Unlike the storage classes 226, the virtual PV storage class 227 natively conforms to the common schema 260. In other words, the key/value pairs of the virtual PV storage class 227 are in the same language as the common schema 260 and do not need further translation. In some implementations, the virtual PV storage classes 227 may be defined first, and the common schema 260 may be created based on the parameters of the virtual PV storage classes 227.

The application 224, either autonomously or via user input, may request a persistent volume from the container orchestrator 222. The request may also include provisioning requirements, such as an indication that the virtual PV storage class 227 is the desired storage class for the requested persistent volume. Other requirements passed with the request may include a desired capacity, for example. The container orchestrator 222 may in turn pass a create volume request 230, via the container storage interface 223 and the container storage interface API 244 for example, to the policy engine 242. In some implementations, the container orchestrator 222 may extract the parameters of the virtual PV storage class 227 and pass the parameters with the request 230 to the policy engine 242. The request 230 may be received within the policy engine 242 by the virtual PV manager 250.

The virtual PV manager 250 may include various operators for manipulating virtual persistent volumes managed by the policy engine 242, including operators to provision new virtual PVs, delete virtual PVs, handle read/write I/O requests directed to virtual PVs, or other operations. These operators may each be hardware or a combination of hardware and programming to implement their respective functionalities. For example, the virtual PV manager 250 may include a provisioner 252 operator to provision new virtual PVs. In particular, the virtual PV manager 250 may determine that the request 230 is a request to provision a new virtual PV and cause the provisioner 252 to handle the request 230.

In response to the request 230, the provisioner 252 begins the process of creating a virtual PV that will ultimately be returned as virtual PV 280 (i.e., including at least a volume identifier) to the container orchestrator 222 for consumption by the application 224. The provisioner 252 determines that the virtual PV storage class 227 was identified in the request 230 as being the desired type of virtual PV to create. The provisioner 252 then assesses each parameter in the requested virtual PV storage class 227 and determines which storage profile 262 has a corresponding parameter that can meet and fulfill the virtual PV storage class 227 parameter. In some implementations, a parameter in the virtual PV storage class 227 is a minimum, such that a closest match of corresponding parameter among storage profiles 262 exceeds the parameter value in storage class 227. This matching of virtual PV storage class 227 parameter to a parameter of a storage profile 262 is made possible by virtue of the virtual PV storage class 227 and the storage profiles 262 being all compliant with and in the language of the common schema 260. For example, if a requested parameter indicates performance:high, the provisioner 252 would identify a storage profile 262 that also includes performance: high.

In some implementations, the provisioner 252 may match the parameters of virtual PV storage class 227 to parameters of storage profiles 262 on a best fit basis. For example, if no parameters of storage profiles 262 were found that match or exceed the virtual PV storage class 227 parameters, the closest parameter may be selected. For example, if a requested parameter indicates performance:high, the provisioner 252 may select a storage profile with performance: medium over other storage profiles with performance:low.

In some implementations, the provisioner 252 may also determine whether matching the virtual PV storage class 227 to a particular storage profile 262 would violate a resource limit or quota of an associated plug-in 228, and if a violation would occur, avoid matching to that plug-in 228. In some implementations, the provisioner 252 may check remaining capacity of a storage 229 using an out-of-band query command (e.g., not via plug-ins 228, container storage interface API 244, or container storage interface 223).

In some implementations, the provisioner 252 may determine that multiple storage profiles 262 (e.g., more than one) may be combined to meet a parameter of the virtual PV storage class 227. For example, a request 230 may request performance:high and 2 terabyte (TB) capacity. However, in this illustration, storage profiles 262-1 and 262-2 with performance:high parameters are limited to 1 TB volumes, either due to remaining capacity or other resource limitations. In this instance, the provisioner 252 may determine to combine 1 TB of capacity from each of storage profiles 262-1 and 262-2 to fulfill the request for 2 TB performance: high.

In some cases, the provisioner 252 may determine that a single storage profile 262 fulfills all of the parameters virtual PV storage class 227. In some cases, the provisioner 252 may determine that multiple different storage profiles 262 are required to fulfill the parameters of the virtual PV storage class 227. For example, a virtual PV storage class 227 may be of a tiered type and may specify high performance primary storage (e.g., low latency, high IOPS) in a first parameter and archival class storage (e.g., low cost, high write speed) for backup in a second parameter. In this example, presuming that storage A profile 262-1 is associated with a high performance storage array 229-1 and storage B profile 262-2 is associated with an archival/backup storage system for illustration purposes, the provisioner 252 may determine that first parameter is fulfilled by the storage A profile 262-1 and the second parameter is fulfilled by the storage B profile 262-2.

Ultimately, the provisioner 252 may create a mapping of the parameters of the virtual PV storage class 227 to parameters of one or more storage profiles 262 serving as proxies for the storage classes 226, such that the parameters of the virtual PV storage class 227 are fulfilled. Thus, the provisioner 252 also identifies the plug-ins 228 (corresponding to the mapped storage profiles 262) to be used to compose a virtual PV having the characteristics of virtual PV storage class 227.

The provisioner 252 coordinates with the container storage interface mapping 256 to provision volumes from each of the storage plug-ins 228 associated with the mapped profiles 262, using their associated storage classes 226. The provisioner 252 informs the container storage interface mapping 256 of the profiles 262 and the plug-ins 228 that the provisioner 252 mapped and identified, and the container storage interface mapping 256 handles low level replacement of each parameter in the virtual PV storage class 227 with one or more of provisioned volumes using the plug-ins 228 identified by the provisioner 252. In this process, the container storage interface mapping 256 may translate parameters of the virtual PV storage class 227 to parameters in the storage classes 226 and then provision volumes using the plug-ins 228 and those translated parameters (since the plug-ins 228 are compatible with the storage classes 226). Provisioning volumes using plug-ins 228 may be similar to provisioning described above in FIG. 1 using plug-ins 128.

To illustrate, if the provisioner 252 determined that storage B profile 262-2 fulfilled a first parameter of the virtual PV storage class 227, the container storage interface mapping 256 may translate that first parameter to a corresponding parameter of storage B storage class 226-2 using the common schema 260 and then issue a create volume request 270 indicating the translated storage B storage class 226-2 parameter (and in some examples, additional parameters such as capacity), via the container storage interface API 244 and the container storage interface 223, to the storage B plug-in 228-2. In turn the storage B plug-in 228-2 provisions storage from the storage system 229-2 according to the request 270 and returns a volume 272, which may include a volume identifier or a persistent volume object or other control plane means for handling a provisioned volume. The container storage interface mapping 256 may repeat the process, sequentially or in parallel, for each parameter of the virtual PV storage class 227. Although FIG. 2 depicts one provisioning request from plug-ins 228 for clarity, it should be understood that in some instances, volumes may be provisioned from more than one plug-in 228 in accordance with the mapping determined by the provisioner 252.

In some implementations, the volume extent and replica manager 254 and/or the data path manager 258 (in conjunction with the data path 232) may provide further functionality for creating and/or managing the virtual PV. Functionality of the volume extent and replica manager 254 may interoperate with the data path manager 258/data path 232 or may be independent of the data path manager 258/data path 232.

In some implementations, the data path manager 258 may send provisioning information 266 to the data path 232. The provisioning information 266 may be information about the volumes provisioned via plug-ins 228 to fulfill the virtual PV storage class 227, which may include type of storage, volume identifiers, etc. (e.g., identifying information about volume 272). The data path 232 may then consume those provisioned volumes to create the virtual PV, in a manner similar to that described above with respect to FIG. 1. In particular, the data path 232 may create the virtual PV to be an organization (e.g., Merkle tree) of metadata objects and data objects, stored in the object store, that are hierarchically related by associated content-based signatures up to a root object. In some implementations, the hierarchically-organized, object store-backed virtual PV is returned to the container orchestrator 222 as the virtual PV 280, and the data path 232 may be involved with servicing I/O requests as described above.

An extent, also referred to as a mini-volume, refers to a portion of the virtual PV. The virtual PV may comprise a single extent (corresponding to a single provisioned volume, for example) or multiple extents. An extent may be aligned with a particular volume provisioned via a plug-in 228 or a subdivision thereof. Dividing the virtual PV into extents may allow I/Os to be efficiently directed to the intended target, such as in the case of tiered storage with high performance tier extents for hot data and archival or backup tier extents for cold data. In this manner, a single virtual PV may have automated built-in tiering capabilities, thus making data tiering simple and invisible to users and administrators. In another example, extents may be useful for managing separate volumes that are to be combined to meet a given parameter of a virtual PV storage class. The volume extent and replica manager 254 may manage extents using an extent table in a manner similar to that described above with respect to FIG. 1 or may offload some or all of such management to the data path 232.

In some implementations, the volume extent and replica manager 254 may coordinate a backup policy specified by the virtual PV storage class 227, throughout the lifecycle of the virtual PV. During the provisioning stage (i.e., after the provisioner 252 has identified primary storage and backup storage storage profiles 262 to fulfill the virtual PV storage class 227), the volume extent and replica manager 254 may coordinate with the container storage interface mapping 256 to first provision a backup volume (e.g., from a backup storage system 229-2 via plug-in 228-2) and then provision the primary storage volume (e.g., from a primary storage system 229-1 via plug-in 228-1) using a provisioning request that identifies the backup volume as a replication target. The storage system hosting the primary storage volume (e.g., storage system 229-1) may then utilize its own replication mechanism to backup data to the backup volume (e.g., at storage system 229-2). In some implementations, a scheduler 246 may operate to schedule backups at a frequency or schedule (e.g., as defined in the virtual PV storage class 227). At each scheduled instance, the scheduler 246 may instruct the primary storage volume plug-in (e.g., 228-1) to backup data to the target backup volume. In this manner, a single virtual PV 280 may include automated backup, thus simplifying backup configuration and maintenance for users and administrators.

Once the one or more volumes have been provisioned via plug-ins 228 in accordance with the virtual PV storage class 227-to-storage profile(s) 262 mapping, a volume mapping is recorded in the virtualization maps 264 data structure that maps the constituent provisioned volumes to the virtual PV being created. For example, if a VOL(2) was provisioned from the storage A plug-in 228-1 and a VOL(3) was provisioned from the storage B plug-in 228-2 in order to fulfill the virtual PV storage class 227, then a mapping of virtual PV(1) being composed of VOL(2) and VOL(3) is recorded into the virtualization maps 264 as depicted in FIG. 2. It should be understood that the foregoing is an illustration, and that a virtual PV may be made up of more or fewer provisioned volumes. As multiple virtual PVs are requested (e.g., for the same virtual PV storage class or different virtual PV storage classes), additional mappings are stored in the virtualization maps 264 data structure. In this sense, the virtualization maps 264 data structure may be deemed dynamic, because new maps may be added as new virtual PVs are created and existing maps may be deleted as virtual PVs are deleted.

The policy engine 242 may return the virtual PV 280 (which may include at least a volume identifier in some implementations) to the container orchestrator 222 via container storage interface API 244 and container storage interface 223, and the container orchestrator 222 may in turn provide the application 224 with access to the virtual PV 280. Subsequently, the container application 224 may perform read and/or writes to the virtual PV 280. The storage virtualization system to which the policy engine 242 belongs can service I/O requests directed to the virtual PV 280 by mediating those I/O requests with the volumes of storage 229 mapped to the virtual PV 280.

In various implementations and scenarios, the nature of the virtual PV 280 provided by the policy engine 242 may differ. For example, if a single underlying volume is mapped and provisioned for the virtual PV storage class 227, then the policy engine 242 may provide the provisioned volume (e.g., 272) directly as virtual PV 280, without involving the data path 232. In another example, a single underlying provisioned volume (e.g., 272) may be passed to the data path 232 and virtualized as described above (e.g., as a hierarchical structure of objects identified by content-based signatures), and that data path virtualized storage is provided as virtual PV 280. In another example, multiple underlying volumes are mapped and provisioned for the virtual PV storage class 227, are virtualized through the data path 232 as described above, and that data path virtualized storage is provided as virtual PV 280.

By virtue of the foregoing, the policy engine 242 may identify and construct, in an automated manner, an optimal or near optimal composition of storage to meet a policy goal represented by in a virtual PV storage class 227 exposed at a container orchestrator 222. The policy engine 242 may leverage an ecosystem of storage plug-ins 228 and storage classes 226 without the intensive manual labor of writing code to support each plug-in 228. Moreover, the policy engine 242 may improve containerized application mobility, because as a containerized application moves to a new container environment, the policy engine 242 can automatically construct the correct persistent storage in the new container environment from storage available and discoverable in that new container environment.

Figure 3:
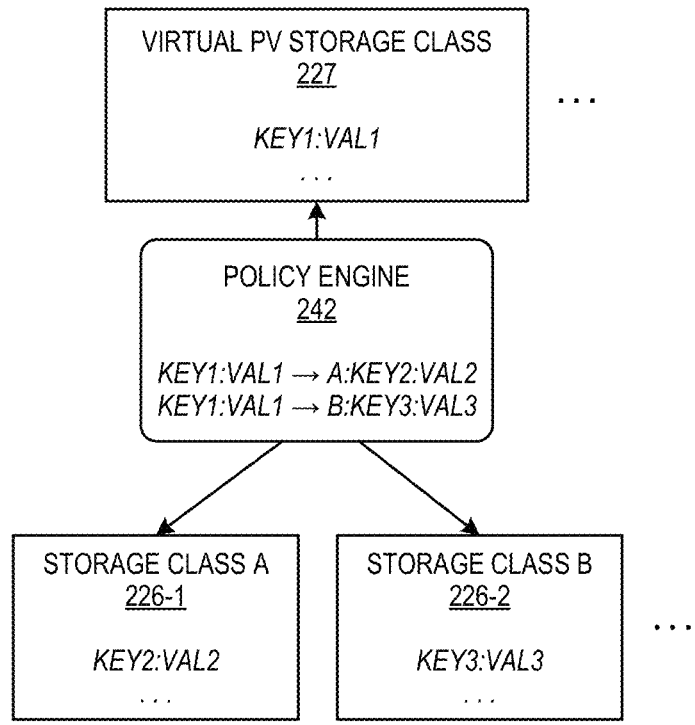
FIG. 3 depicts an example mapping by a policy engine of a virtual persistent volume storage class to available storage classes.

FIG. 3 depicts an example mapping of storage classes by the policy engine 242 using the common schema 260. For example, the virtual PV storage class 227 may include a parameter key/value pair "KEY1:VAL1", storage class A 226-1 may include a parameter key/value pair "KEY2:VAL2", and storage class B 226-2 may include a parameter key/value pair "KEY3:VAL3". Without the policy engine 242, it may not be evident that any of these parameters are related or how their values are compare. The policy engine 242, using the common schema 260, may determine that "KEY1" of virtual PV storage class 227 (which is natively in the language of the common schema 260) may correspond to storage class A 226-1 "KEY2" and storage class B 226-2 "KEY3". Additionally, the common schema 260 may translate "VAL2" and "VAL3" into the value range used by "VAL1". As discussed above with respect to FIG. 2, translation via the common schema 260 may be used by the provisioner 252 for identifying which storage classes 226 and plug-ins 228 fulfill parameters of a requested virtual PV storage class 227 and used by the container storage interface mapping 256 for provisioning volumes using the plug-ins 228 to meet the parameters of the virtual PV storage class 227.

Figure 4:
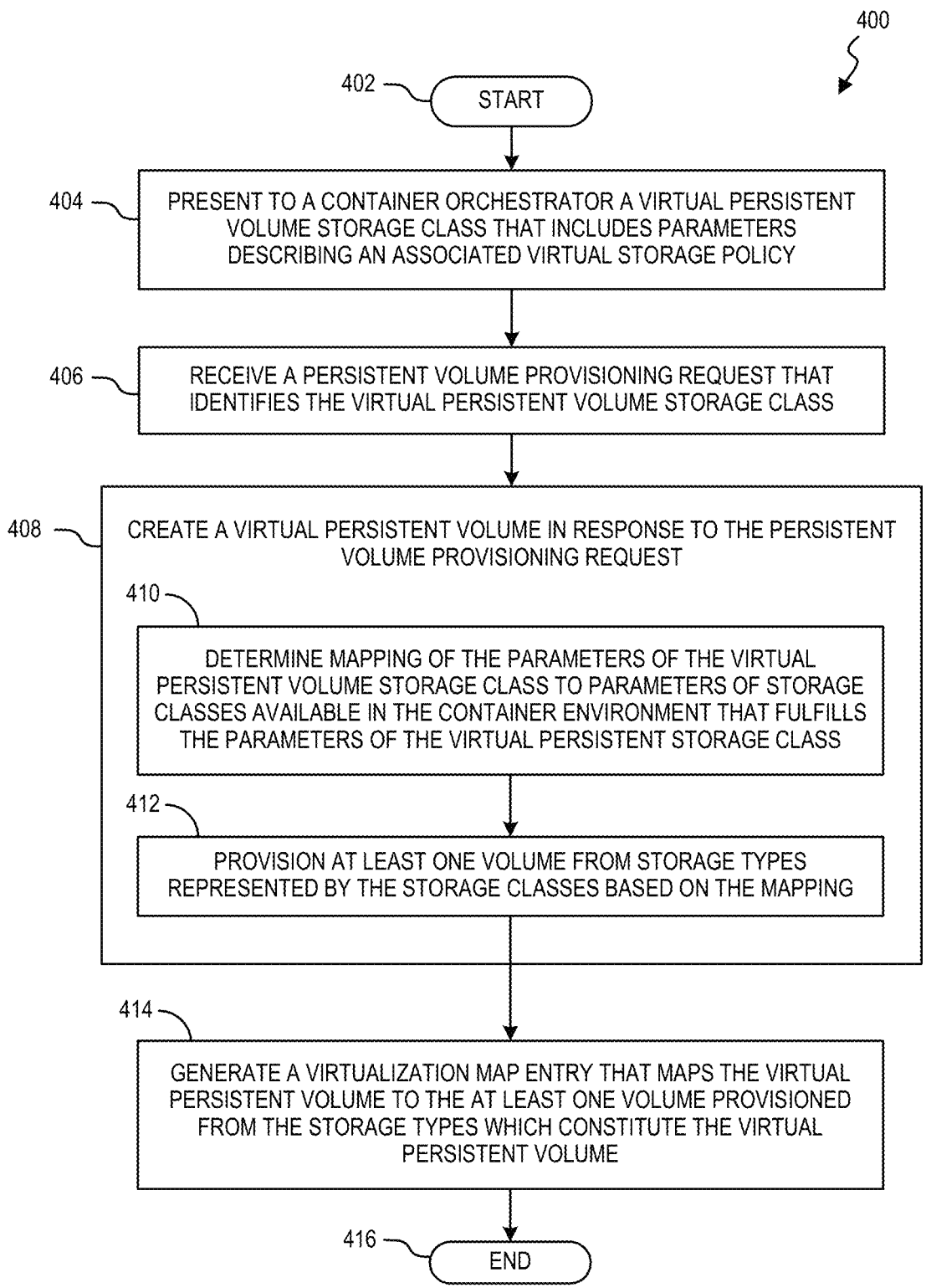
FIG. 4 depicts an example method that includes creating a virtual persistent volume in response to a provisioning request identifying a virtual persistent volume storage class.
Figure 5:
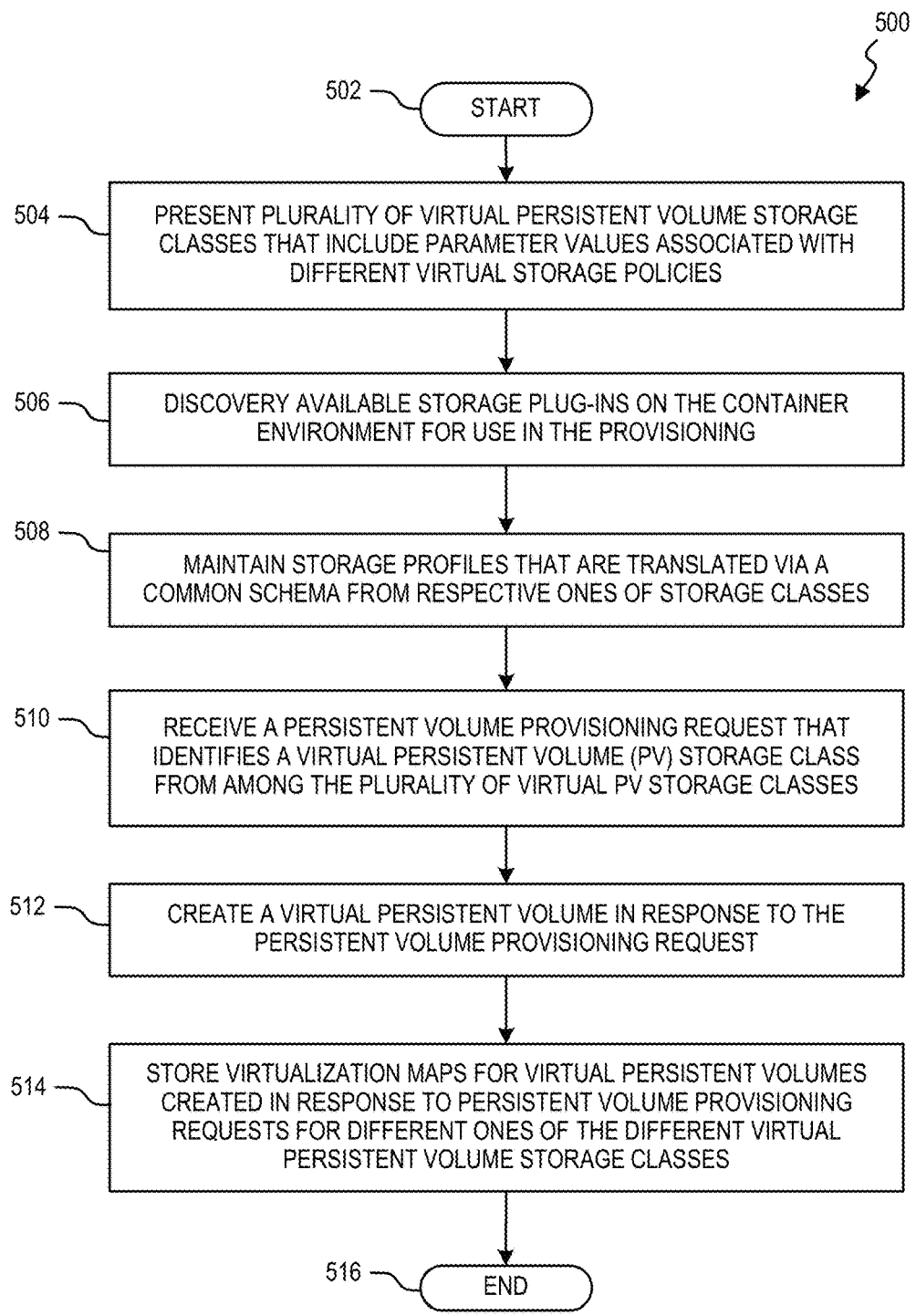
FIG. 5 depicts an example method that includes presenting plural virtual persistent volume storage classes and maintaining storage profiles translated via a common schema from storage classes.

FIGS. 4 and 5 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods shown in FIGS. 4 and 5 may be implemented in the form of executable instructions stored on a machine readable medium and executed by a processing resource and/or in the form of electronic circuitry. For example, aspects of the methods may be described below as being performed by a storage virtualization system on a computing system, an example of which may be the containerized storage virtualization system 130 on the computing system 100 described above, and which may be further attributed to a policy engine of such a storage virtualization system, such as the policy engine 242 described above. Additionally, other aspects of the methods described below may be described with reference to other elements shown in FIG. 2 for non-limiting illustration purposes.

FIG. 4 is a flow diagram depicting an example method 400. Method 400 starts at block 402 and continues to block 404, where a storage virtualization system (or a policy engine 242 thereof) in a container environment presents, to a container orchestrator 222 a virtual PV storage class 227 that includes parameters describing an associated virtual storage policy.

At block 406, the storage virtualization system receives a persistent volume provisioning request 230 that identifies the virtual persistent volume storage class 227. The request 230 may include individual parameters of the virtual PV storage class 227. The request 230 may also include a capacity requirement.

At block 408, the storage virtualization system creates a virtual persistent volume 280 in response to the persistent volume provisioning request 230. Block 408 involves additional sub-blocks 410, 412.

At block 410, the storage virtualization system determines a mapping of the parameters of the virtual PV storage class 227 to parameters of storage classes 226 available in the container environment, such that the parameters of the virtual PV storage class 227 are fulfilled by the mapping. In some instances, at least some of the storage classes 226 are associated with different storage vendors or different storage systems.

At block 412, the storage virtualization system provisions at least one volume 272 from storage types 229 represented by the storage classes 226 based on the mapping determined at block 410. The provisioned volume or volumes together constitute the virtual persistent volume 280 created by block 408 and requested at block 406. The virtual PV 280 may be passed back to a container orchestrator 222 as a volume identifier.

At block 414, the storage virtualization system generates a virtualization map (e.g., an entry in virtualization maps 264 data structure) that maps the virtual persistent volume 280 to the at least one volume 272 provisioned from the storage types 229 which constitute the virtual persistent volume 280. Method 400 ends at block 416.

FIG. 5 is a flow diagram depicting an example method 500. Method 500 starts at block 502 and continues to block 504, where a plurality of different virtual persistent volume storage classes (e.g., 227 being an example of one) having different parameter values associated with different virtual storage policies are presented (or in other words, are published) to a container orchestrator 222. For example, the different virtual PV storage classes may represent gold, silver, and bronze tier offerings of virtual PVs that a storage virtualization system may offer. In other examples, other virtual PV storage classes may be offered for one or more different policy goals, such as performance goals, tiered storage, mixed public cloud and private/local storage goals, RPO and/or RTO goals, redundancy goals, backup goals, or other goals. In some implementations, the virtual PV storage classes may be designed by a storage administrator or other user.

At block 506, the storage virtualization system discovers available storage plug-ins 228 on the container environment. The plug-ins 228 may be useful for provisioning storage volumes 272 from associated storage systems 229.

At block 508, the storage virtualization system translates storage classes 226 into storage profiles 262 using a common schema 260, and maintains those storage profiles 262 in a data structure in hardware memory for example. In some cases, some of the storage classes 226 may be associated with different vendors. The storage classes 226 may exhibit non-standardized parameters. The virtual PV storage classes (e.g., 227) published at block 504, however, may natively conform to the common schema 260.

At block 510, the storage virtualization system receives a persistent volume provisioning request 230 that identifies one of the plurality of virtual persistent volume storage classes (e.g., 227). For example, the persistent volume provisioning request 230 may have originated from a containerized application 224 in the container environment or from a user thereof, and received by the storage virtualization system via a container storage interface API 244.

At block 512, the storage virtualization system may create a virtual PV 280 in response to the persistent volume provisioning request 230 received at block 510. Block 512 may be analogous in many respects to blocks 408, 410, and 412 described above. The storage virtualization system may use plug-ins 228 discovered at block 506 to provision the volumes constituting the virtual PV.

At block 514, the storage virtualization system stores virtualization maps for virtual persistent volumes (e.g., in a virtualization maps 264 data structure) created by the storage virtualization system in response to persistent volume provisioning requests for different ones of the different virtual persistent volume storage classes. Block 514 may be analogous to block 414 described above, and relates to having a virtualization map for each virtual PV created by the methods described herein. Method 500 ends at block 516.

Figure 6:
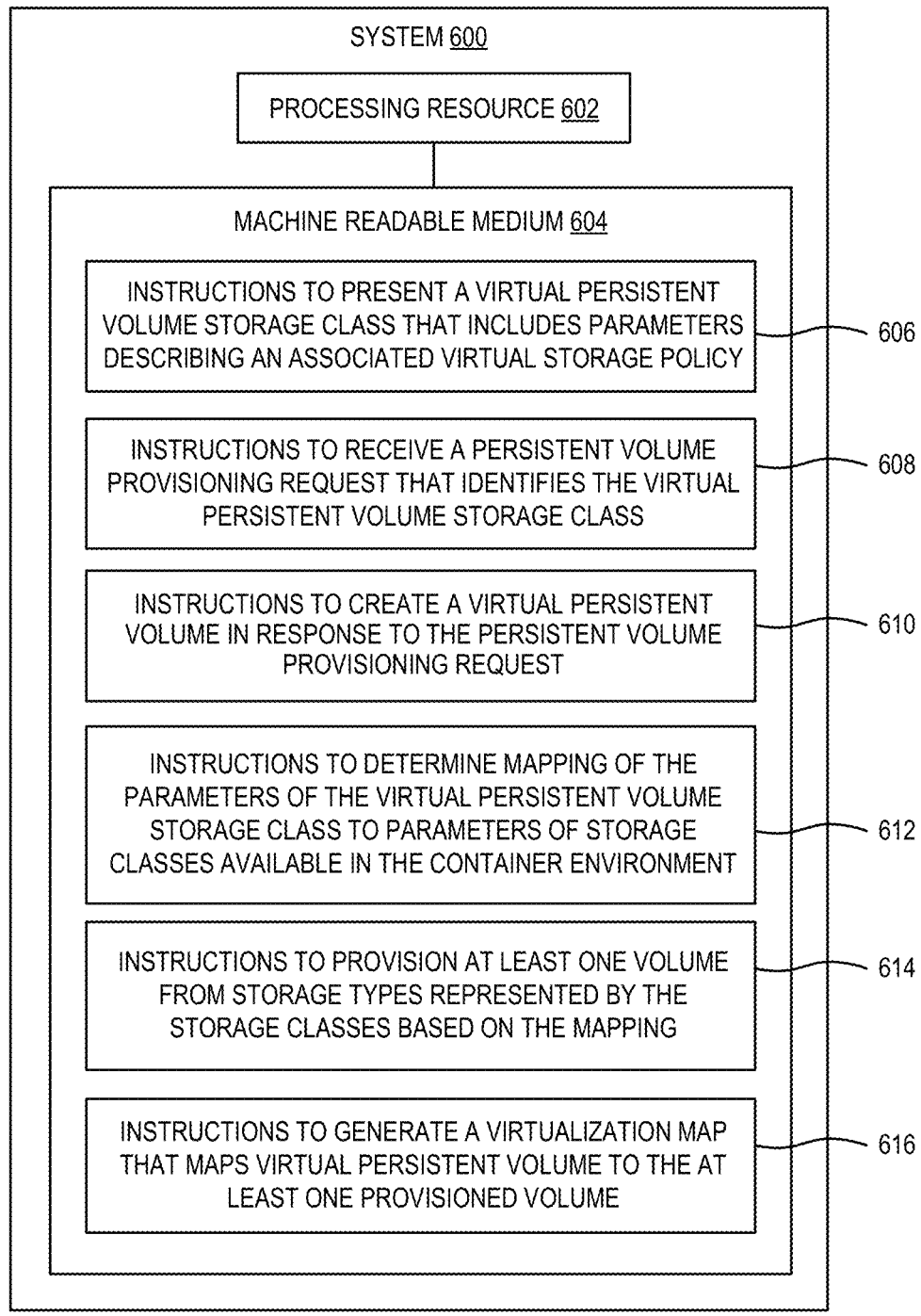
FIG. 6 depicts an example system with a machine readable medium that includes instructions to create a virtual persistent volume in response to a provisioning request identifying a virtual persistent volume storage class.

FIG. 6 depicts an example system 600 that includes a non-transitory, machine readable medium 604 encoded with example instructions 606, 608, 610, 612, 614, 616 (collectively referred to as instructions 606-616) executable by a processing resource 602. In some implementations, the system 600 may be useful for implementing aspects of the storage virtualization system 130 of FIG. 1 or the policy engine 242 of FIG. 2 or for performing aspects of method 400 of FIG. 4 or method 500 of FIG. 5. For example, instructions 606-616 may be included in instructions 105 of FIG. 1. In some implementations, functionality described with respect to FIG. 2 may be included in instructions 606-616.

The processing resource 602 may include a microcontroller, a microprocessor, central processing unit core(s), an ASIC, an FPGA, and/or other hardware device suitable for retrieval and/or execution of instructions from the machine readable medium 604 to perform functions related to various examples. Additionally or alternatively, the processing resource 602 may include or be coupled to electronic circuitry or dedicated logic for performing some or all of the functionality of the instructions described herein.

The machine readable medium 604 may be any medium suitable for storing executable instructions, such as RAM, ROM, EEPROM, flash memory, a hard disk drive, an optical disc, or the like. In some example implementations, the machine readable medium 604 may be a tangible, non-transitory medium. The machine readable medium 604 may be disposed within the system 600, in which case the executable instructions may be deemed installed or embedded on the system 600. Alternatively, the machine readable medium 604 may be a portable (e.g., external) storage medium, and may be part of an installation package.

As described further herein below, the machine readable medium 604 may be encoded with a set of executable instructions 606-616. It should be understood that part or all of the executable instructions and/or electronic circuits included within one box may, in alternate implementations, be included in a different box shown in the figures or in a different box not shown. Some implementations of the system 600 may include more or fewer instructions than are shown in FIG. 6.

Instructions 606, when executed, cause the processing resource 602 to present (or publish) to a container orchestrator in a container environment a virtual PV storage class that includes parameters describing an associated virtual storage policy. Instructions 606 may be executed multiple times with different virtual PV storage classes, so as to publish multiple different virtual PV storage classes to the container orchestrator.

Instructions 608, when executed, cause the processing resource 602 to receive a persistent volume provisioning request that identifies the virtual PV storage class. The provisioning request may originate from a containerized application or a user thereof.

Instructions 610, when executed, cause the processing resource 602 to create a virtual PV in response to the persistent volume provisioning request. Instructions 610 may further include or call instructions 612 and 614.

Instructions 612, when executed, cause the processing resource 602 to determine a mapping of the parameters of the virtual persistent volume storage class to parameters of storage classes available in the container environment, such that the mapped parameters of the storage classes fulfills the parameters of the virtual PV storage class. In some instances, one storage class sufficiently fulfills the parameters of the virtual PV storage class. In other instances, multiple storage classes are determined to map to various parameters of the virtual PV storage class.

Instructions 614, when executed, cause the processing resource 602 to provision at least one volume from storage types represented by the storage classes in accordance with the mapping. The provisioned volume or volumes constitute the virtual persistent volume. Instructions 614 may interface with discovered storage plug-ins to perform the provisioning. Moreover, instructions 614 may pass replication target information to a plug-in, in a manner analogous to that described above with respect to the volume extent and replica manager 254.

Instructions 616, when executed, cause the processing resource 602 to generate a virtualization map entry that maps the virtual persistent volume created by instructions 610, 612, 614 to the provisioned volume or volumes that constitute the virtual persistent volume.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed:

1. A non-transitory machine readable medium storing instructions that are executable by a processing resource to:
present to a container orchestrator in a container environment a virtual persistent volume storage class that includes parameters describing an associated virtual storage policy;
receive a persistent volume provisioning request that identifies the virtual persistent volume storage class that is compliant with a common schema;
receive, from the container orchestrator, information of different storage classes available in the container environment;
translate the different storage classes in the information received from the container orchestrator to respective storage profiles that are compliant with the common schema;
create a virtual persistent volume in response to the persistent volume provisioning request by:
    mapping the parameters of the virtual persistent volume storage class to parameters of the respective storage profiles as proxies for the different storage classes available in the container environment, the mapping based on a determination that the parameters of the respective storage profiles in combination fulfill the parameters of the virtual persistent volume storage class, and
    provisioning volumes of different storage types represented by the different storage classes based on the mapping, the virtual persistent volume comprising a blend of the volumes of the different storage types; and generate a virtualization map entry that maps the virtual persistent volume to the volumes of the different storage types which constitute the virtual persistent volume.

2. The non-transitory machine readable medium of claim 1, wherein the persistent volume provisioning request is from a containerized application.

3. The non-transitory machine readable medium of claim 1, wherein the different storage classes are non-standardized and at least some of the different storage classes are associated with different storage vendors.

4. The non-transitory machine readable medium of claim 1, further comprising instructions executable by the processing resource to discover available storage plug-ins of the container environment for use in the provisioning, the available storage plug-ins comprising storage plug-ins associated with the different storage types represented by the different storage classes.

5. The non-transitory machine readable medium of claim 1, further comprising instructions executable by the processing resource to:
present to the container orchestrator a plurality of different virtual persistent volume storage classes having different parameter values associated with different virtual storage policies; and
store virtualization maps for virtual persistent volumes in response to persistent volume provisioning requests for different ones of the different virtual persistent volume storage classes.

6. The non-transitory machine readable medium of claim 1, wherein the blend of the volumes of the different storage types are arranged in a hierarchical structure that relates data objects by content-based signatures to a root object.

7. The non-transitory machine readable medium of claim 1, wherein the virtual persistent volume storage class includes a backup policy, and the mapping that fulfills the parameters of the virtual persistent volume storage class is associated with a backup storage class and a primary storage class, and
wherein the instructions to create the virtual persistent volume comprises:
instructions to provision, as one of the volumes in the blend of the volumes of the different storage types, a backup volume associated with the backup storage class, and
instructions to provision, as another of the volumes in the blend of the volumes of the different storage types, a primary storage volume associated with the primary storage class.

8. A method comprising:
presenting to a container orchestrator, by a storage virtualization system comprising a hardware processor in a container environment, a virtual persistent volume storage class that includes parameters describing an associated virtual storage policy;
receiving, by the storage virtualization system, a persistent volume provisioning request that identifies the virtual persistent volume storage class that is compliant with a common schema;
receiving, by the storage virtualization system from the container orchestrator, information of different storage classes available in the container environment;
translating, by the storage virtualization system, the different storage classes in the information received from the container orchestrator to respective storage profiles that are compliant with the common schema;
creating, by the storage virtualization system, a virtual persistent volume in response to the persistent volume provisioning request by:
mapping the parameters of the virtual persistent volume storage class to parameters of the respective storage profiles as proxies for the different storage classes available in the container environment, the mapping based on a determination that the parameters of the respective storage profiles in combination fulfill the parameters of the virtual persistent volume storage class, and
provisioning volumes of different storage types represented by the different storage classes based on the mapping, the virtual persistent volume comprising a blend of the volumes of the different storage types; and
generating a virtualization map entry that maps the virtual persistent volume to the volumes of the different storage types which constitute the virtual persistent volume.

9. The method of claim 8, wherein at least some of the different storage classes are associated with different storage vendors.

10. The method of claim 8, wherein the persistent volume provisioning request is from a containerized application.

11. The method of claim 8, further comprising discovering, by the storage virtualization system, available storage plug-ins of the container environment for use in the provisioning, the available storage plug-ins comprising storage plug-ins associated with the different storage types represented by the respective-different storage classes.

12. The method of claim 8, further comprising:
presenting to the container orchestrator, by the storage virtualization system, a plurality of different virtual persistent volume storage classes having different parameter values associated with different virtual storage policies; and
storing, by the storage virtualization system, virtualization maps for virtual persistent volumes created by the storage virtualization system in response to persistent volume provisioning requests for different ones of the different virtual persistent volume storage classes.

13. The method of claim 8, wherein the virtual persistent volume storage class includes a backup policy, and the mapping that fulfills the parameters of the virtual persistent volume storage class is associated with a backup storage class and a primary storage class, and
wherein the creating of the virtual persistent volume comprises:
provisioning, as one of the volumes in the blend of the volumes of the different storage types, a backup volume associated with the backup storage class, and
provisioning, as another of the volumes in the blend of the volumes of the different storage types, a primary storage volume associated with the primary storage class.

14. The method of claim 8, wherein the blend of the volumes of the different storage types are arranged in a hierarchical structure that relates data objects by content-based signatures to a root object.

15. A system comprising:
a processing resource; and
a non-transitory machine readable medium storing instructions that, when executed, cause the processing resource to:

present to a container orchestrator in a container environment a virtual persistent volume storage class that includes parameters describing an associated virtual storage policy;

receive a persistent volume provisioning request that identifies the virtual persistent volume storage class that is compliant with a common schema;

receive, from the container orchestrator, information of different storage classes available in the container environment;

translate the different storage classes in the information received from the container orchestrator to respective storage profiles that are compliant with the common schema;

create a virtual persistent volume in response to the persistent volume provisioning request by:

mapping the parameters of the virtual persistent volume storage class to parameters of the respective storage profiles as proxies for the different storage classes available in the container environment, the mapping based on a determination that the parameters of the respective storage profiles in combination fulfill the parameters of the virtual persistent volume storage class, wherein at least some of the different storage classes are associated with different storage vendors, and provisioning volumes of different storage types represented by the different storage classes based on the mapping, the virtual persistent volume comprising a blend of the volumes of the different storage types; and generate a virtualization map entry that maps the virtual persistent volume to the volumes of the different storage types which constitute the virtual persistent volume.

16. The system of claim 15, wherein the persistent volume provisioning request is from a containerized application.

17. The system of claim 15, wherein the blend of the volumes of the different storage types are arranged in a hierarchical structure that relates data objects by content-based signatures to a root object.

18. The system of claim 15, wherein the virtual persistent volume storage class includes a backup policy, and the mapping that fulfills the parameters of the virtual persistent volume storage class is associated with a backup storage class and a primary storage class, and wherein the creating of the virtual persistent volume comprises:

provisioning, as one of the volumes in the blend of the volumes of the different storage types, a backup volume associated with the backup storage class, and provisioning, as another of the volumes in the blend of the volumes of the different storage types, a primary storage volume associated with the primary storage class.

19. The system of claim 15, wherein the non-transitory machine readable medium stores instructions that executed cause the processing resource to:

discover available storage plug-ins of the container environment for use in the provisioning, the available storage plug-ins comprising storage plug-ins associated with the different storage types represented by the respective-different storage classes.

* * * * *